United States Patent
Kim et al.

(10) Patent No.: US 11,533,645 B2
(45) Date of Patent: Dec. 20, 2022

(54) METHOD AND DEVICE FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Seonwook Kim, Seoul (KR); Changhwan Park, Seoul (KR); Inkwon Seo, Seoul (KR); Suckchel Yang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/666,261

(22) Filed: Feb. 7, 2022

(65) Prior Publication Data

US 2022/0167193 A1  May 26, 2022

Related U.S. Application Data

(63) Continuation of application No. PCT/KR2020/010156, filed on Jul. 31, 2020.

(30) Foreign Application Priority Data

Aug. 16, 2019 (KR) .................. 10-2019-0100633

(51) Int. Cl.
*H04W 72/12* (2009.01)
*H04W 24/08* (2009.01)
(Continued)

(52) U.S. Cl.
CPC ....... *H04W 24/08* (2013.01); *H04L 27/26025* (2021.01); *H04W 72/042* (2013.01);
(Continued)

(58) Field of Classification Search
CPC ............ H04W 72/044; H04W 72/042; H04W 72/0453; H04W 72/1268; H04W 72/1289;
(Continued)

(56) References Cited

U.S. PATENT DOCUMENTS

2013/0294318 A1* 11/2013 Amerga .................. H04W 4/06
                                                        370/312
2019/0313437 A1* 10/2019 Jung ..................... H04L 5/0053
2021/0329647 A1* 10/2021 Park ..................... H04L 1/0072

FOREIGN PATENT DOCUMENTS

WO   2019099661 A1   5/2019

OTHER PUBLICATIONS

CATT, "PDCCH enhancements for URLLC", 3GPP TSG RAN WG1 Meeting #96bis, Apr. 8-12, 2019, R1-1905359.
(Continued)

*Primary Examiner* — Wei Zhao
(74) *Attorney, Agent, or Firm* — Dentons US LLP

(57) ABSTRACT

A method for a terminal to transmit or receive a signal in a wireless communication system according to an embodiment of the present invention can include: monitoring physical downlink control channel (PDCCH) candidates; obtaining downlink control information (DCI) through a PDCCH detected in a first slot as a result of monitoring the PDCCH candidates; and receiving a physical downlink shared channel (PDSCH) or transmitting a physical uplink shared channel (PUSCH) in a second slot on the basis of the DCI.

19 Claims, 18 Drawing Sheets

(51) Int. Cl.
*H04L 27/26* (2006.01)
*H04W 72/04* (2009.01)

(52) U.S. Cl.
CPC ..... *H04W 72/044* (2013.01); *H04W 72/1268* (2013.01); *H04W 72/1289* (2013.01)

(58) Field of Classification Search
CPC ............. H04W 24/08; H04L 27/26025; H04L 5/0042; H04L 5/0053
See application file for complete search history.

(56) References Cited

OTHER PUBLICATIONS

CATT, "Discussion on cross-carrier scheduling with different numerologies", 3GPP TSG RAN WG1 Meeting #97, May 13-17, 2019, R1-1906311.
Qualcomm Incorporated, "Cross-slot scheduling power saving techniques", 3GPP TSG-RAN WG1 #97, May 13-17, 2019, R1-1907295.
MediaTek Inc., "Summary of Cross-slot Scheduling Power-Saving Techniques", 3GPP TSG RAN WG1 Meeting #97, May 13-17, 2019, R1-1907840.

\* cited by examiner

Non - interleaved CCE - to - REG mapping

METHOD AND DEVICE FOR TRANSMITTING AND RECEIVING WIRELESS SIGNAL IN WIRELESS COMMUNICATION SYSTEM

This application is a continuation of International Application No. PCT/KR2020/010156 filed Jul. 31, 2020 and published Feb. 25, 2021 as WO 2021/033952 A1, which claims priority to Korean Patent Application No. 10-2019-0100633 filed Aug. 16, 2019, the contents of which are hereby incorporated by reference herein in their entirety.

TECHNICAL FIELD

The present disclosure relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DETAILED DESCRIPTION OF THE DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, provided herein is a method of transmitting or receiving a signal by a user equipment (UE) in a wireless communication system, including monitoring physical downlink control channel (PDCCH) candidates; obtaining downlink control information (DCI) through a PDCCH detected in a first slot as a result of monitoring the PDCCH candidates; and receiving a physical downlink shared channel (PDSCH) or transmitting a physical uplink shared channel (PUSCH) in a second slot based on the DCI. The DCI may schedule reception of the PDSCH or transmission of the PUSCH in a second bandwidth part (BWP) configured with a second subcarrier spacing (SCS). The DCI may include information about a slot offset 'K' between the first slot and the second slot. The UE may determine the second slot in which reception of the PDSCH or transmission of the PUSCH is to be performed based on the slot offset 'K'.

In another aspect of the present disclosure, provided herein is a user equipment (UE) for wireless communication, including a transceiver; and at least one processor configured to control the transceiver. The at least one processor may be configured to monitor physical downlink control channel (PDCCH) candidates, acquire downlink control information (DCI) through a PDCCH detected in a first slot as a result of monitoring the PDCCH candidates, and receive a physical downlink shared channel (PDSCH) or transmit a physical uplink shared channel (PUSCH) in a second slot, based on the DCI, through the transceiver. The DCI may schedule reception of the PDSCH or transmission of the PUSCH in a second bandwidth part (BWP) configured with a second subcarrier spacing (SCS) and the DCI may be configured to include information about a slot offset 'K' between the first slot and the second slot. The at least one processor may determine the second slot in which reception of the PDSCH or transmission of the PUSCH is to be performed based on the slot offset 'K'.

In another aspect of the present disclosure, provided herein is a device for performing signal processing for wireless communication, including at least one processor configured to execute one or more instructions; and a memory configured to provide a reading/writing space in the at least one processor. The at least one processor may be configured to perform signal processing related to monitoring of physical downlink control channel (PDCCH) candidates based on execution of the one or more instructions, acquire downlink control information (DCI) through a PDCCH detected in a first slot as a result of monitoring the PDCCH candidates, and perform signal processing related to reception of a physical downlink shared channel (PDSCH) or transmission of a physical uplink shared channel (PUSCH) in a second slot based on the DCI. The DCI may schedule reception of the PDSCH or transmission of the PUSCH in a second bandwidth part (BWP) configured with a second subcarrier spacing (SCS) and the DCI may be configured to include information about a slot offset 'K' between the first slot and the second slot. The at least one processor may determine the second slot in which reception of the PDSCH or transmission of the PUSCH is to be performed based on the slot offset 'K'.

In another aspect of the present disclosure, provided herein is a method of transmitting or receiving a signal by a base station (BS) in a wireless communication system, including generating downlink control information (DCI); transmitting a physical downlink control channel (PDCCH) carrying the DCI through a candidate in a first slot among PDCCH candidates; and transmitting a physical downlink shared channel (PDSCH) or transmitting a physical uplink shared channel (PUSCH), scheduled by the DCI in a second slot. The DCI may schedule transmission of the PDSCH or reception of the PUSCH in a second bandwidth part (BWP) configured with a second subcarrier spacing (SCS) and the DCI may be configured to include information about a slot offset 'K' between the first slot and the second slot. The BS may indicate the second slot) in which transmission of the PDSCH or reception of the PUSCH is to be performed based on the slot offset "K.

In another aspect of the present disclosure, provided herein is a base station (BS) for wireless communication, including a transceiver; and at least one processor configured to generate downlink control information (DCI), wherein the at least one processor may be configured to control the transceiver to transmit a physical downlink control channel (PDCCH) carrying the DCI through a candidate in a first slot among PDCCH candidates, and transmit a physical downlink shared channel (PDSCH) or transmit a physical uplink shared channel (PUSCH), scheduled by the DCI in a second slot. The DCI may schedule transmission of the PDSCH or reception of the PUSCH in a second bandwidth part (BWP) configured with a second subcarrier spacing (SCS) and the DCI may be configured to include information about a slot offset 'K' between the first slot and the second slot. The at least one processor may indicate the second slot in which transmission of the PDSCH or reception of the PUSCH is to be performed based on the slot offset 'K', A minimum value 'Min_K' for the slot offset 'K' in the second BWP may be determined based on a first SCS configured in a first BWP different from the second BWP A ratio between the second SCS and the first SCS may be used to determine the minimum value 'Min_K' based on that the first BWP and the second BWP are different from each other.

The UE (or the device) may not be expected to receive the PDSCH or transmit the PUSCH in a slot related to a 'K' value smaller than the determined minimum value 'Min_K'. The BS may not expect the UE (or the device) will receive the PDSCH or transmit the PUSCH in a slot related to a 'K' value smaller than the determined minimum value 'Min_K'.

The UE (or the device) may assume that the DCI will not indicate a 'K' value 'K' smaller than the determined minimum value 'Min_K' in a process of monitoring the PDCCH candidates and acquiring the DCI. The BS may generate the DCI so as not to indicate a 'K' value 'K' smaller than the determined minimum value 'Min_K'.

The first BWP may be a BWP which has been previously used by the UE (or the device).

The minimum value 'Min_K' may be determined to be proportional to the ratio between the second SCS and the first SCS.

The minimum value 'Min_K' may be determined based on "$2^{\mu2}/2^{\mu1}$", where '$\mu1$' may be a value denoting the first SCS configured in the first BWP and '$\mu2$' may be a value denoting the second SCS configured in the second BWP. The minimum value "Min_K may be determined based on '$(2^{\mu2}/2^{\mu1})$*min_Slot_Offset', where 'min_Slot_Offset' may denote the minimum value 'Min_K' configured in the first BWP.

A BWP in which the PDCCH is detected may be different from the second BWP in which reception of the PDSCH or transmission of the PUSCH is performed.

The UE (or the device) may receive at least one of a first time domain resource allocation (TDRA) table related to the PDSCH or a second TDRA table related to the PUSCH, through radio resource control (RRC) signaling. The first TDRA table may include one or more PDCCH-to-PDSCH slot offset 'K0' values. The second TDRA table may include one or more PDCCH-to-PUSCH slot offset 'K2' values. The slot offset 'K' may be one of the 'K0' values of the first TDRA table or one of the 'K2' values of the second TDRA table.

The UE (or device) may assume that, based on the minimum value 'Min_K', which is a minimum value 'Min_K0' related to the PDSCH, a value smaller than the minimum value 'Min_K0' among the 'K0' values of the first TDRA table is not indicated 'Min_K0' 'K0' by the slot offset 'K'. The UE (or the device) may assume that, based on the minimum value 'Min_K' which is a minimum value 'Min_K2' related to the PUSCH, a value smaller than the minimum value 'Min_K2' among the 'K2' values of the second TDRA table is not indicated 'Min_K2' 'K2' by the slot offset 'K'. The BS may generate the DCI such that, based on the minimum value 'Min_K', which is a minimum value 'Min_K0' related to the PDSCH, a value smaller than the minimum value 'Min_K0' among the 'K0' values of the first TDRA table is not indicated 'Min_K0' 'K0' by the slot offset 'K'. The BS may generate the DCI such that, based on the minimum value 'Min_K' which is a minimum value 'Min_K2' related to the PUSCH, a value smaller than the minimum value 'Min_K2' among the 'K2' values of the second TDRA table is not indicated 'Min_K2' 'K2' by the slot offset 'K'.

The UE (or the device) or the BS may determine a minimum value 'Min_K0' as the minimum value 'Min_K' related to the PDSCH and determines a minimum value 'Min_K2' as the minimum value 'Min_K' related to the PUSCH. The minimum value 'Min_K0' and the minimum value 'Min_K2' may be determined independently of each other.

The UE may perform monitoring the PDCCH candidates in a specific BWP of a first component carrier (CC) among a plurality of CCs configured for the UE. The UE may perform reception of the PDSCH or transmission of the PUSCH in a second CC including the second BWP. The UE may determine the second slot using a minimum value 'Min_K' configured for the specific BWP of the first CC. The second slot is slot #(n+m+k), where "slot #n" may denote a slot having a lowest index among slots of the second BWP overlapping with a slot of the specific BWP in which the PDCCH is detected, "m" may denote the minimum value 'Min_K' configured for the specific BWP as the number of slots in the second BWP, and "k" may denote a slot offset indicated by the DCI as the number of slots in the second BWP.

In another aspect of the present disclosure, provided herein is a processor-readable recording medium in which a program for performing the method of transmitting or receiving a signal by the UE/BS is recorded.

Advantageous Effects

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE DISCLOSURE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
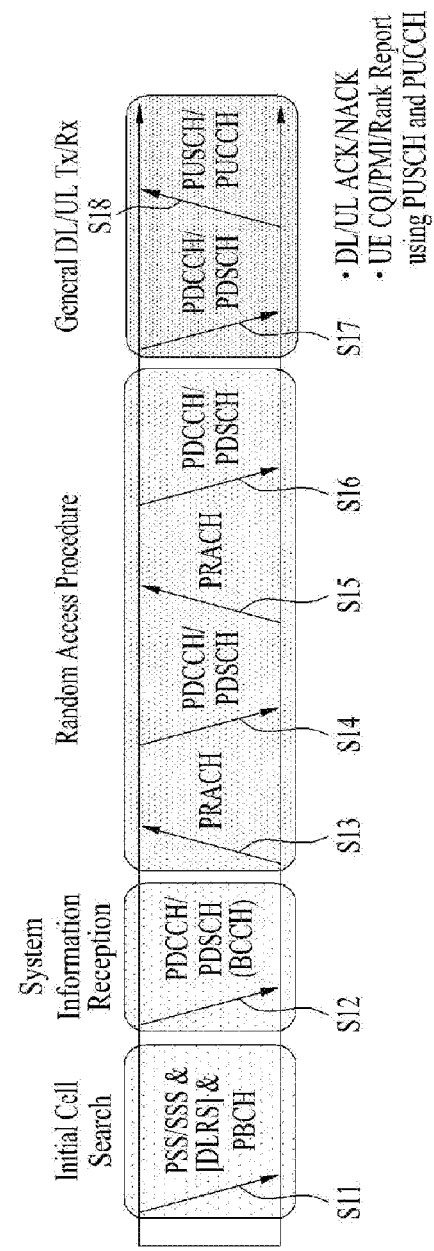
FIG. 1 illustrates physical channels used in a 3rd generation partnership project (3GPP) system as an exemplary wireless communication system, and a general signal transmission method using the same.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
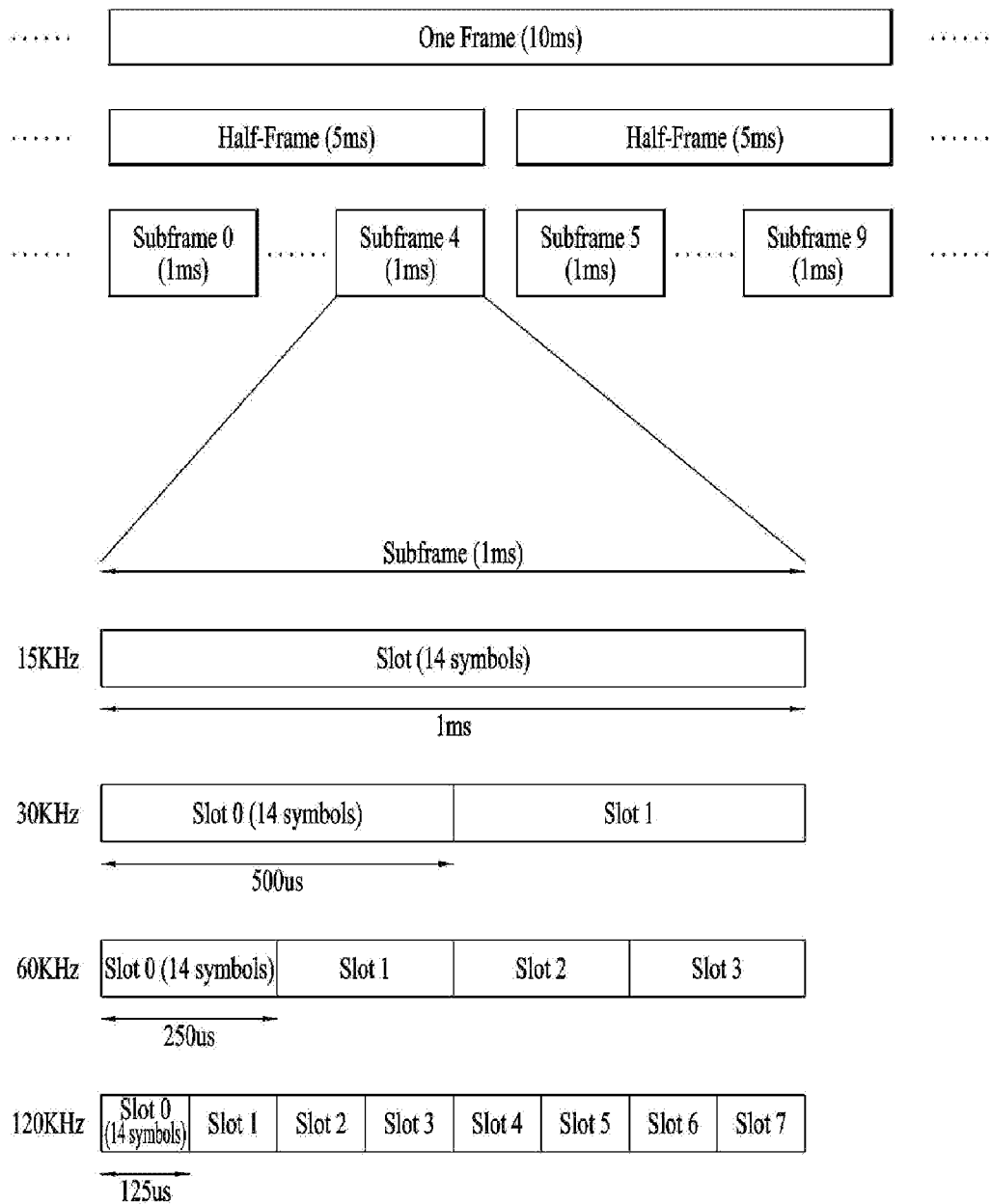
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
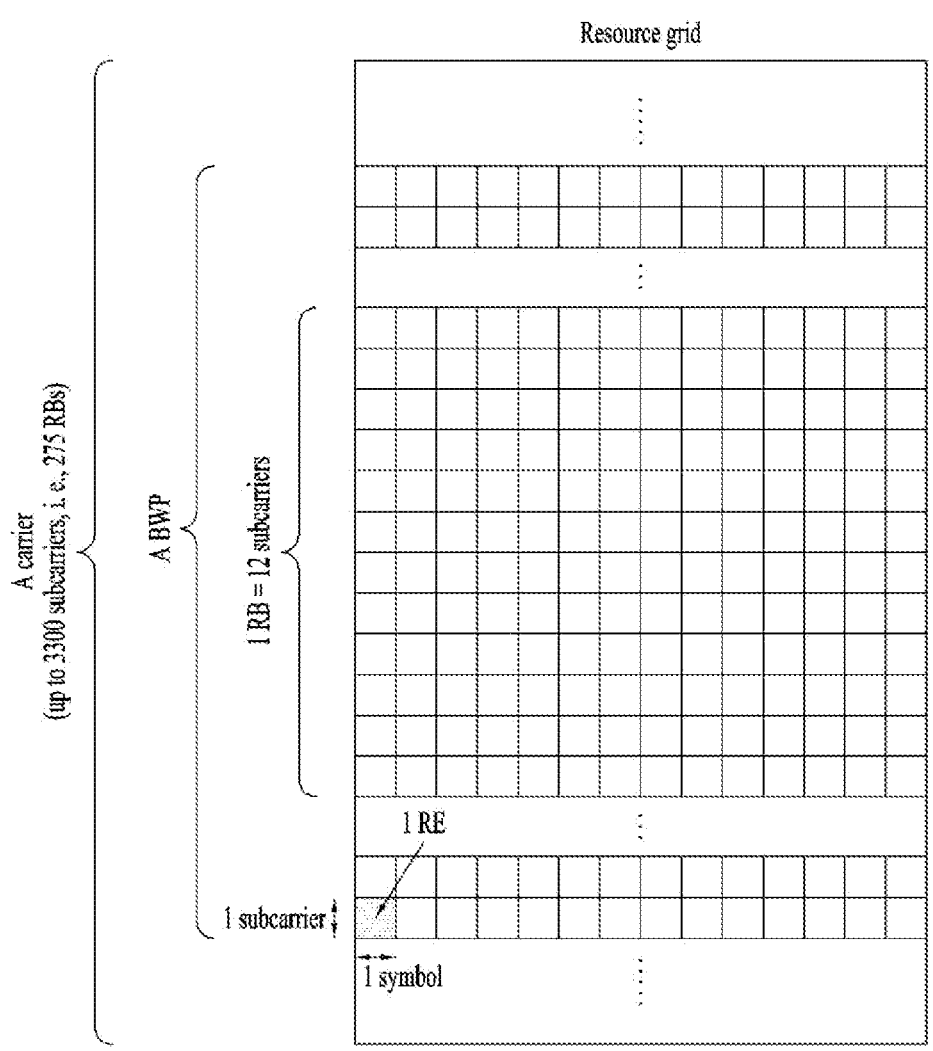
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
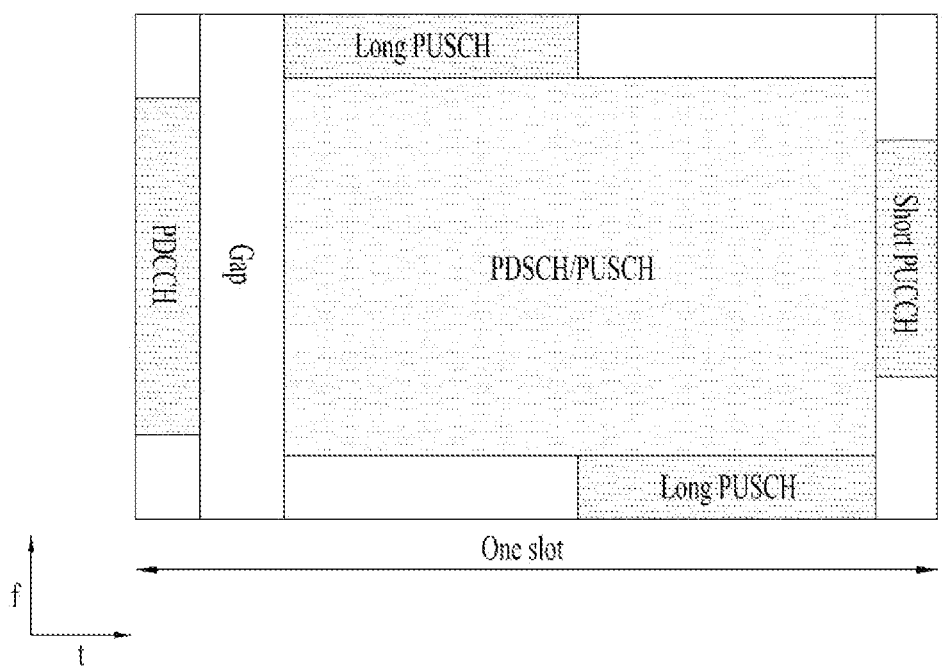
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
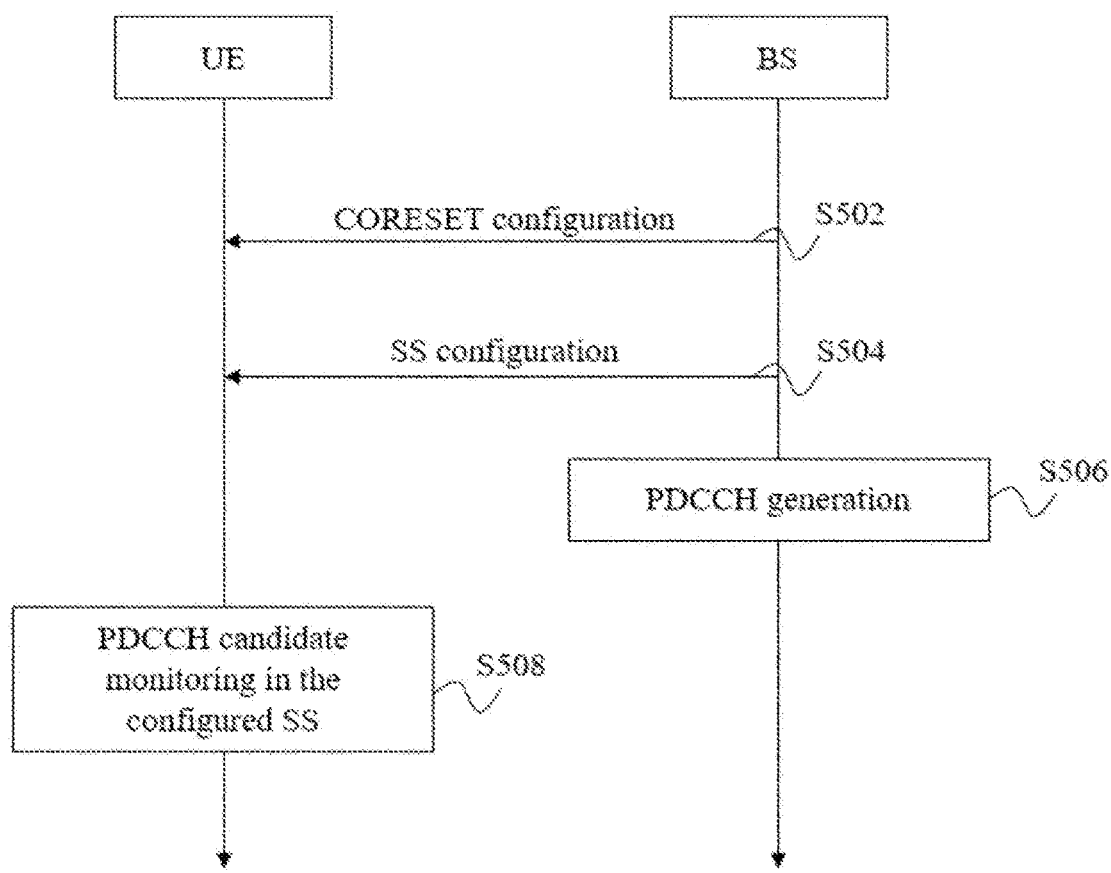
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.
frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.

duration: indicates the time resources of the CORESET. Duration indicates the number of consecutive OFDM symbols included in the CORESET. Duration has a value of 1 to 3.

cce-REG-MappingType: indicates a control channel element (CCE)-REG mapping type. Interleaved and non-interleaved types are supported.

interleaverSize: indicates an interleaver size.

pdcch-DMRS-ScramblingID: indicates a value used for PDCCH DMRS initialization. When pdcch-DMRS-ScramblingID is not included, the physical cell ID of a serving cell is used.

precoderGranularity: indicates a precoder granularity in the frequency domain.

reg-BundleSize: indicates an REG bundle size.

tci-PresentInDCI: indicates whether a transmission configuration index (TCI) field is included in DL-related DCI.

tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.

controlResourceSetId: indicates a CORESET associated with the SS.

monitoringSlotPeriodicityAndOffset: indicates a periodicity (in slots) and offset (in slots) for PDCCH monitoring.

monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: indicates the number of PDCCH candidates (one of values 0, 1, 2, 3, 4, 5, 6, and 8) for each AL where AL={1, 2, 4, 8, 16}.

searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Figure 6:
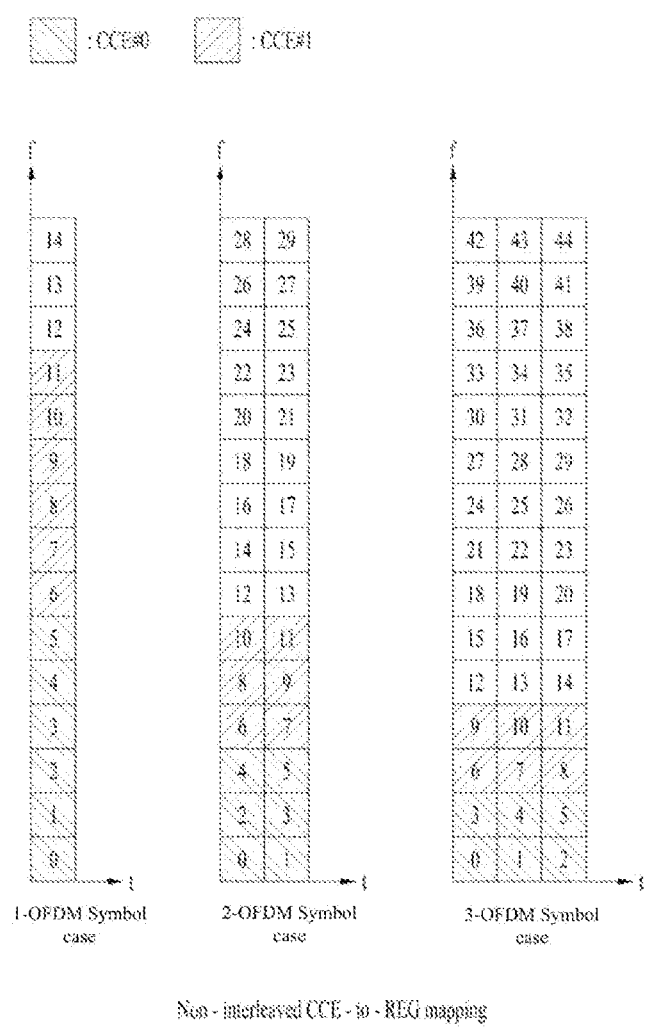
FIGS. 6 and 7 illustrate exemplary control resource set (CORESET) structures.
Figure 7:
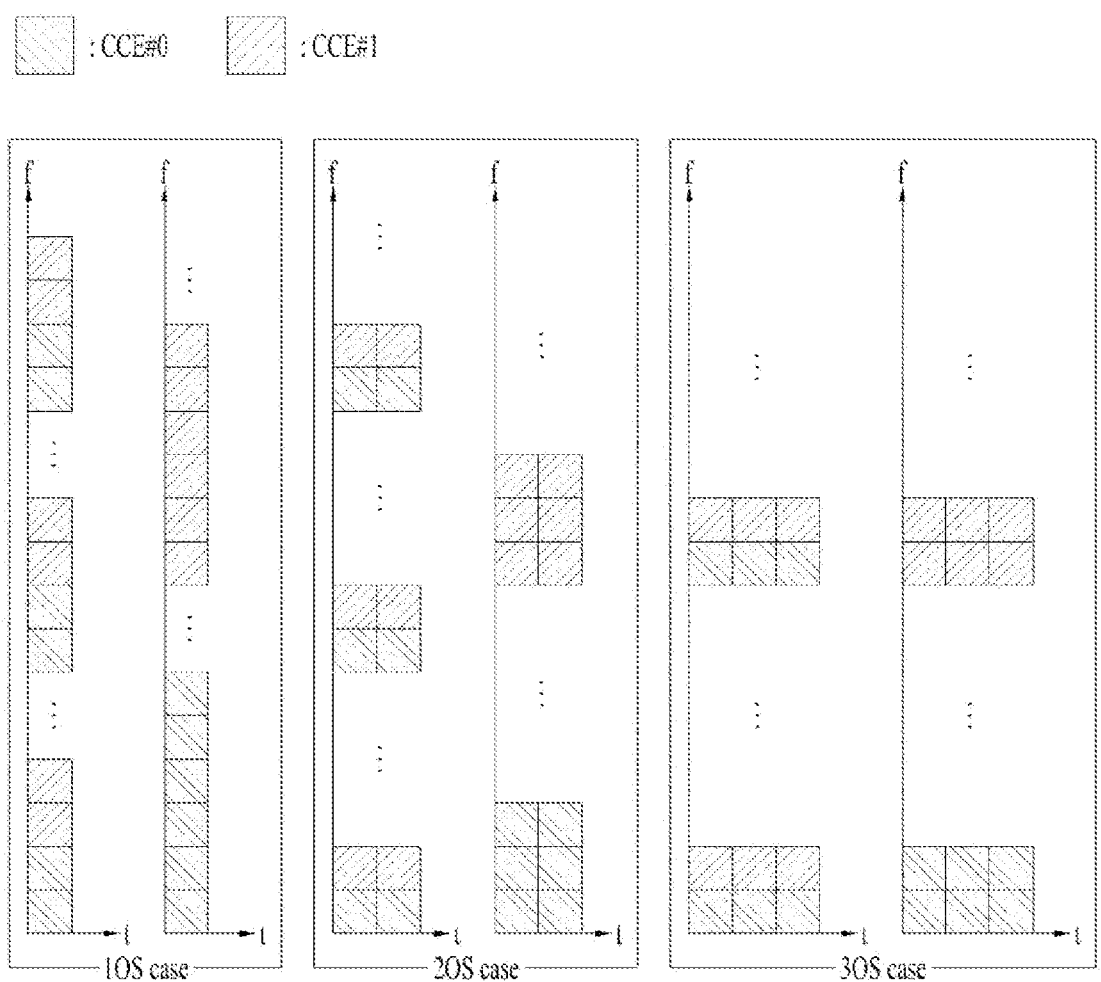

Interleaved CCE-to-REG mapping (or distributed CCE-to-REG mapping) (FIG. 6): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

In the NR system, information related to a time interval between DL/UL scheduling DCI-to-DL/UL data transmission and reception and/or information related to a HARQ timing may be dynamically indicated through DCI of a PDCCH.

Hereinafter, for convenience of description, K0, K1, or K2 will be defined as a time (e.g., slot) interval between "Slot A" and "Slot B" as shown in Table 5 below.

TABLE 5

| | Slot A | Slot B |
|---|---|---|
| K0 | DL scheduling DCI | Corresponding DL Data Transmission |
| K1 | DL data reception | Corresponding HARQ-ACK |
| K2 | UL scheduling DCI | Corresponding UL Data Transmission |

Figure 8:
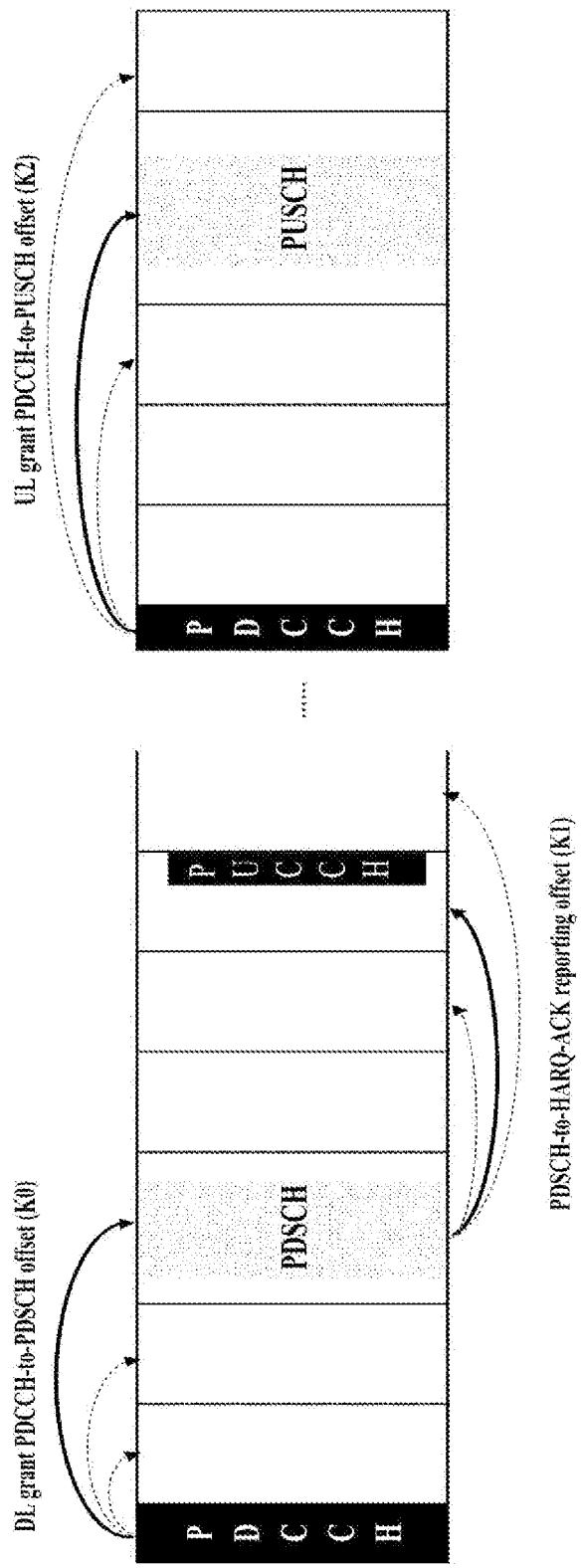
FIGS. 8 to 12 illustrate various examples of a dynamic slot offset indication according to an embodiment of the present disclosure.

FIG. 8 is a diagram for explaining a method of dynamically indicating an interval (e.g., DL/UL scheduling-to-data transmission or HARQ timing) between slots through DCI of a PDCCH.

Referring to FIG. 8, there are illustrated (i) a time interval (K0=3 slots) between a slot to which a PDCCH carrying DL scheduling DCI is mapped and a slot to which a PDSCH carrying DL data is mapped, (ii) a time interval (K1=4 slots) between a slot to which the PDSCH carrying the DL data is mapped and a slot to which HARQ-ACK information (e.g., a PUCCH carrying HARQ-ACK information) is mapped, and (iii) a time interval (K2=4 slots) between a slot to which a PDCCH carrying UL scheduling DCI is mapped and a slot to which a PUSCH carrying UL data is mapped. The time interval K0, K1, or K2 may be expressed as an offset of a slot unit. While, in FIG. 8, it is assumed that a channel carrying the HARQ-ACK information is assumed to be the PUCCH, the HARQ-ACK information of the PUCCH may be transmitted by being piggybacked on the PUSCH and the PUCCH may be dropped, according to an embodiment.

As an example, a network may configure a set of X (1≤X) K0 values {first K0 value, second K0 value, third K0 value . . . . N-th K0 value} for a UE through higher layer signaling (e.g., UE-specific RRC signaling) and indicate any one within the set of the X K0 values through DL grant DCI. The UE may perform DL data (e.g., PDSCH) reception based on the K0 value indicated through the DCI. The network may configure a set of Y (1≤Y) K1 values {first K1 value, second K1 value, third K1 value . . . . Y-th K1 value} for the UE through higher layer signaling (e.g., UE-specific RRC signaling) and indicate any one within the set of the Y K1 values through the DL grant DCI. The UE may perform HARQ-ACK transmission (e.g., PUCCH) for DL data based on the K1 value indicated through the DL grant DCI. The network may configure a set of Z (1≤Z) K2 values {first K2 value, second K2 value, third K2 value . . . Z-th K2 value} for the UE through higher layer signaling (e.g., UE-specific RRC signaling) and indicate any one within the set of the Z K2 values through UL grant DCI. The UE may perform UL data (e.g., PUSCH) transmission based on the K2 value indicated through the UL grant DCI. Each of the set of the K0 values, the set of the K1 values, and/or the set of the K2 values may be configured in the form of a list (or table) and may be referred to as a time domain resource allocation (TDRA) table or TDRA list. For example, the set of the K0 values may be referred to as a PDSCH-TDRA list (or table), and the set of the K1 values may be referred to as a PUSCH-TDRA list (or table).

Before the UE receives the PDSCH-TDRA list through RRC signaling (e.g., a procedure of setting up an RRC connection), a predefined default K0 value may be applied to an SIB received through the PDSCH. The default K0 value may be a value defined in Section 5.1.2.1 of 3GPP NR standard document TS 38.214.

As DL grant DCI of a PDCCH mapped to slot #n indicates the value of K0, a PDSCH scheduled by the DL grant DCI may be mapped to slot #n+K0. If the DL grant DCI of the PDCCH indicates the K1 value and the PDSCH scheduled by the DL grant DCI is mapped to slot #m, HARQ-ACK for the corresponding PDSCH may be mapped to slot #m+K1. When UL grant DCI of the PDCCH mapped to the slot #n indicates the K2 value, a PUSCH scheduled by the UL grant DCI may be mapped to slot #n+K2.

Figure 9:
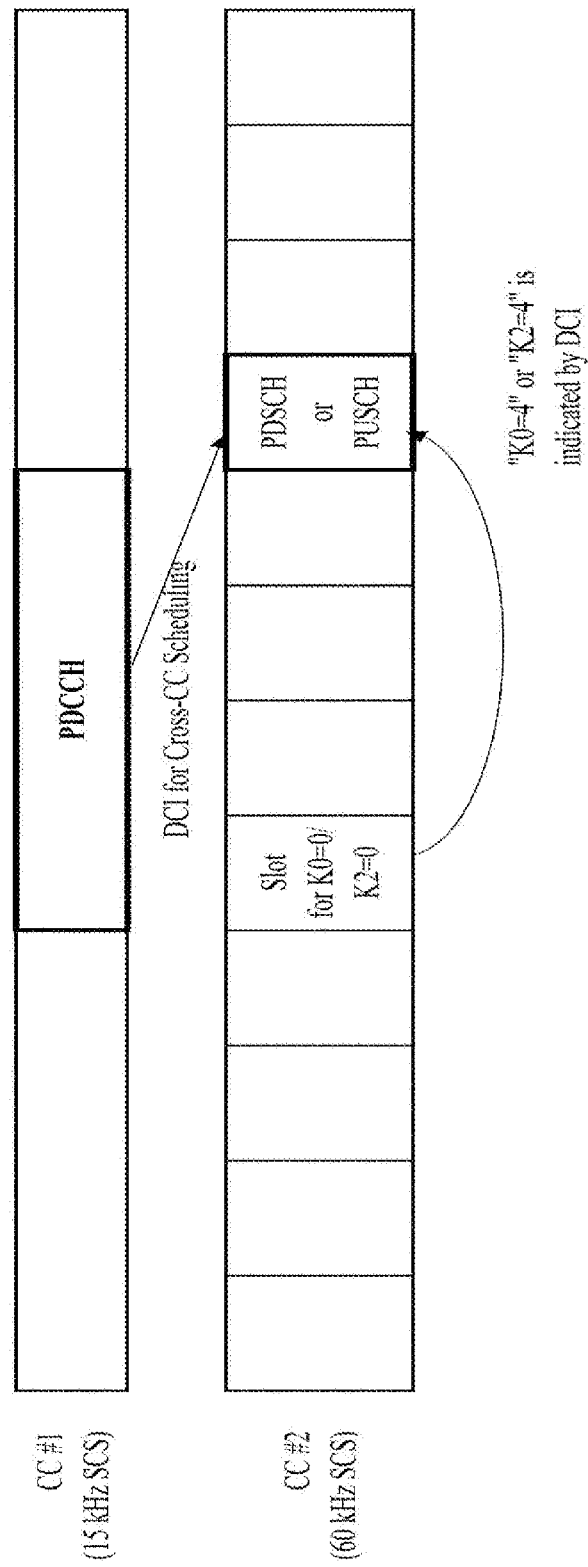

FIG. 9 is a diagram for explaining a method of dynamically indicating an interval between slots (e.g., DL/UL scheduling-to-data transmission or HARQ timing) through DCI of a PDCCH when cross-carrier scheduling is used.

The numerology of component carrier (CC) #1 in which a scheduling PDCCH is transmitted and the numerology of CC #2 in which a scheduled PDSCH/PUCCH is transmitted may be configured identically or differently. For convenience, while, in FIG. 9, it is assumed that the SCS of CC #1 is 15 kHz and the SCS of CC #2 is 60 kHz, they may be changed to various other SCSs, and the number of CCs may be configured such that 2 or more CCs are configured for one UE. A CC may be simply referred to as a carrier or may be referred to as a serving cell. Alternatively, in each embodiment to be described later, the term "CC" may be changed/replaced/substituted to/with "bandwidth part (BWP)". For example, "a plurality of CCs" may be changed to "a plurality of BWPs", and "cross-carrier scheduling" may be replaced with "cross-BWP scheduling". In addition, in cross-BWP scheduling, a scheduling BWP and a scheduled BWP may be included in the same CC or may be included in different CCs. For example, a scheduling BWP of a scheduling CC may schedule a PDCCH and/or a PUSCH in a scheduled BWP of a scheduled CC.

In the case of cross-carrier scheduling between CCs of different SCSs as illustrated in FIG. 9, the time granularity of K0 or K2 indicated by the DCI may be indicated/ configured/interpreted by K0 or K2 based on the SCS of CC #2 in which PDCCH/PUSCH transmission is performed.

In addition, when a slot corresponding to K0=0 or a slot corresponding to K2=0 is referred to as a reference slot, each reference slot is determined as the first slot in CC #2 overlapping the slot of CC #1 to which the PDCCH is mapped.

The start symbol of the PDSCH is expressed as "S0" and the symbol duration of the PDSCH is expressed as "L0". A set of {S0, L0, K0} may be dynamically indicated. Specifically, the network may configure X (1≤X) {S0, L0, K0} sets, such as {S0, L0, K0}=Set #0, . . . Set #X, for the UE through higher layer signaling (e.g., RRC signaling). The network may indicate (e.g., joint-indicate) any one of the X sets through a DL grant PDCCH (i.e., a specific field of the DL grant DCI). The UE may receive the PDSCH (i.e., DL data) based on the value of {S0, L0, K0} indicated through the DL grant PDCCH.

In addition, the start symbol of HARQ-ACK transmission for DL data (e.g., the start symbol of a PUCCH carrying HARQ-ACK information) is expressed as "S1", and the symbol duration of HARQ-ACK transmission is expressed as "L1". {S1, L1} and K1 may be dynamically indicated through the DL grant PDCCH (i.e., DL grant DCI). For example, {S1, L1} and K1 may be separately indicated through specific fields of the DL grant DCI. Specifically, the network may configure U (1≤U) {S1, L1} sets, such as {S1, L1}=Set #0, . . . Set #P, for the UE through higher layer signaling (e.g., RRC signaling) and configure Y K1 values for the UE. Any one of the U {S1, L1} sets may be indicated through a first field (e.g., ACK/NACK resource indication (ARI) field) of the DL grant DCI, and any one of U K1 values may be indicated through a second field (e.g., ACK/ NACK timing indicator (ATI) field). The UE may transmit HARQ-ACK (e.g., a PUCCH carrying HARQ-ACK information) for DL data, based on the {S1, L1} and the K1 value, indicated through the DL grant PDCCH.

In addition, the start symbol of the PUSCH is expressed as "S2" and the symbol duration of the PDSCH is expressed as "L2". A set of {S2, L2, K2} may be dynamically indicated. Specifically, the network may configure Z (1≤Z) {S2, L2, K2} sets, such as {S2, L2, K2}=Set #0, . . . Set #Z, for the UE through higher layer signaling (e.g., RRC signaling). The network may indicate (e.g., joint-indicate) any one of the Z sets through a UL grant PDCCH (i.e., a specific field of the UL grant DCI). The UE may transmit the PUSCH (i.e., UL data) based on the {S2, L2, K2} value indicated through the UL grant PDCCH.

Continuous power consumption may occur while the UE receives a DL signal. Assuming that the DL signal is a PDCCH, the UE may always consume power to perform the following operations during PDCCH reception (e.g., monitoring, blind decoding, or detection attempt). Such operations may ultimately entail unnecessary power consumption according to content actually indicated by the PDCCH.

1) During a PDCCH decoding delay time, a signal capable of transmitting a PDSCH that the corresponding PDCCH may potentially schedule is stored in a memory.

For example, when the UE attempts to blind-detect a PDCCH candidate on a first time resource, the UE assumes that the PDCCH candidate may be actually detected as a PDCCH carrying DL grant DCI. In other words, on the assumption that the DL grant DCI may schedule PDSCH transmission after the first time resource, the UE stores, in the memory (e.g., a buffer), DL signals on all time resources (e.g., a second time resource, a third time resource, etc.) on which the PDSCH may be scheduled in consideration of the possibility of potential PDSCH reception until the blind detection process of the corresponding PDCCH candidate is completed. However, the corresponding PDCCH candidate may not include an actual PDCCH signal. In this case, the UE discards the DL signals buffered for the PDSCH. Such buffering may cause excessive power consumption in the UE. In addition, even if the corresponding PDCCH candidate includes the actual PDCCH signal, if the PDSCH is scheduled on the N-th time resource, the DL signals buffered on the second time resource to the (N−1)-th time resource are also discarded.

2) When the PDCCH schedules the PUSCH, the UE performs PDCCH decoding at a fairly high clock in order to secure a PUSCH generation time. The UE determines a PDCCH decoding time by assuming the minimum number of slots (e.g. K2) of the TDRA table configured for the UE as an interval between the PDCCH and a potential scheduled PUSCH.

For example, as described above, in a state in which a plurality of K2values is configured for the UE through higher layer signaling, the UE blind-detecting the PDCCH candidate that may include UL grant DCI blind-decodes the PDCCH candidate at a high clock by assuming the minimum among the plural K2 values. However, even if the PDCCH candidate actually includes the UL grant DCI, there may be the case in which the corresponding DCI indicates a sufficiently large K2 value rather than the minimum K2 value. High power consumption due to driving of a high-speed processor results in excessive power consumption.

3) In addition to the examples of 1) and 2), excessive power consumption may be caused in various operations of the UE. For example, in preparation for the possibility that the PDCCH will indicate channel state information-reference signal (CSI-RS) reception (e.g., aperiodic CSI report request) or sounding reference signal (SRS) transmission, a PDCCH decoding rate of the UE may be considerably high, and such a PDCCH decoding rate may have a significant effect on power consumption of the UE in the end.

As such, in order to minimize unnecessary power consumption of the UE due to the uncertain and potential indication of the PDCCH (e.g., data scheduling/HARQ-ACK transmission timing), the BS may additionally configure scheduling delay information, which is a specific duration that allows the UE not to expect data scheduling/ HARQ-ACK within the TDRA table configured for the UE. This is referred to as "minimum applicable K0", "minimum applicable K1", or "minimum applicable K2". For example, the UE may blind-decode the PDCCH by assuming that a K0 value smaller than the "minimum applicable K0" will not be indicated through the DL grant DCI. Similarly, the UE may blind-decode the PDCCH by assuming that a K1 value smaller than the "minimum applicable K1" will not be indicated through the DL grant DCI. In addition, the UE may assume that a K2 value smaller than the "minimum applicable K2" will not be indicated through the UL grant DCI. The minimum applicable K0, K1, and K2 values may have values larger than the minimum values of the K0, K1, and K2 values (e.g., values in the TDRA table) configured for the UE, respectively. The UE may expect that values smaller than the minimum applicable K0 among K0 values configured through higher layer signaling will not be used for PDSCH scheduling. The same expectation is possible for the K1 value or the K2 value.

In this way, the UE is allowed to expect that only a scheduling delay of more than a specific value larger than the minimum value of the TDRA table will be used in the PDCCH, and thus the mentioned power consumption factors 1), 2), and 3) may be alleviated. In this case, if a CC or a BWP including the PDCCH monitored by the UE and a potential CC or a potential BWP that may include a signal/channel that the PDCCH may schedule have different numerologies, the minimum applicable K0, K1, and K2 values to be used for a corresponding scheduled CC or BWP (a minimum applicable scheduling delay, or a scheduling delay to be applied to the corresponding scheduled CC or BWP) need to be newly defined or a rule of applying the minimum applicable K0, K1, and K2 values to the scheduled CC or BWP needs to be newly defined.

For example, referring back to FIG. 9, an example in which scheduling delay K0 or K2 is applied to a scheduled CC is illustrated in a state in which the numerologies of CC #1 in which the scheduling PDCCH is transmitted and CC #2 in which the scheduled PDSCH/PUCCH is transmitted are different. Specifically, when the PDCCH of CC #1 schedules the PDSCH of CC #2 and the K0 or K2 value is 4, the UE/BS interprets the scheduling delay K0 or K2 value based on the numerology of scheduled CC #2. However, since the UE monitoring the PDCCH in CC #1 is not aware of whether the PDCCH schedules the PDSCH/PUSCH of CC #1 (i.e., self-CC scheduling) or the PDSCH/PUSCH of CC #2 (i.e., cross-CC scheduling), it is necessary to consider both cases. For example, assume that the minimum applicable scheduling delay K0 or K2 value of 2 is given to CC #1. The UE should consider the possibility that the PDSCH/PUSCH is scheduled in CC #2 based on cross-CC scheduling in slot #n+1, which is the next slot immediately after slot #n to which the PDCCH is mapped. Therefore, even if the minimum applicable scheduling delay K0 or K2 value is given as 2 in CC #1, there is a problem in that the UE decodes the PDCCH at a high rate in preparation for PDSCH reception/PUSCH transmission in slot #n+1 rather than slot #n+2.

To solve this, if the minimum applicable scheduling delay K0 or K2 value of 2 configured in CC #1 is scaled according to the numerology of CC #2, the minimum applicable scheduling delay K0 or K2 value in cross-scheduled CC #2 is 8. As a result, the minimum applicable scheduling delay value becomes excessively large. For example, if the maximum value of the scheduling delay K0 or K2 value of the table configured for the UE is 4, the minimum applicable scheduling delay value of 8 scaled for CC #2 may not exist in the TDRA table of the UE. The same problem may occur even in the case of K1.

Accordingly, an embodiment in which power consumption of the UE may be maintained to be the same as in the case of self-CC scheduling while solving such a problem is disclosed.

Table 6 is an excerpt of the description of PDCCH-to-PDSCH specified in Section 5.1.2.1 of NR standard document TS 38.213 and a PDCCH-to-PUSCH timing specified in Section 6.1.2.1 of NR standard document TS 38.213. As described above, the PDCCH-to-PDSCH slot offset 'K0' is indicated by the DCI scheduling the PDSCH, and the PDCCH-to-PUSCH slot offset 'K2' is indicated by the DCI scheduling the PUSCH.

TABLE 6

[PDSCH transmission timing (TS 38.213 Section 5.1.2.1: Resource allocation in time domain)]

The slot allocated for the PDSCH is $\left\lfloor n \cdot \frac{2^{PDCCH}}{2^{PDSCH}} \right\rfloor + K_0$, where $n$ is the slot with the scheduling DCI (i.e., PDCCH), and $K_0$ is based on the numerology of PDSCH, and $P_{PDSCH}$ and $P_{PDCCH}$ are the subcarrier spacing configurations for PDSCH and PDCCH, respectively.

. . .

[PUSCH transmission timing (TS 38.213 Section: 6.1.2.1 Resource allocation in time domain)]

The slot where the UE shall transmit the PUSCH is determined by $K_2$ as $\left\lfloor n \cdot \frac{2^{PDCCH}}{2^{PDSCH}} \right\rfloor + K_2$ where $n$ is the slot with the scheduling DCI (i.e., PDCCH), $K_2$ is based on the numerology of PUSCH, and $P_{PUSCH}$ and $P_{PDCCH}$ are the subcarrier spacing configurations for PUSCH and PDCCH, respectively.

According to an embodiment of the present disclosure, when a first CC or a first BWP cross-schedules a channel/signal (e.g., PDSCH or PUSCH) in a second CC or a second BWP having a different numerology (SCS) therefrom, the scheduling delay (K0 or K2) value for the second CC or the second BWP expected by the UE may be defined as follows.

A slot offset $K0_{Scheduled}$ applied to a scheduled CC or BWP may be defined as $\min\_K0_{Scheduling} \times 2^{(uPDSCH-uPDCCH)} + K0'$. $\min\_K0_{Scheduling}$ may denote a minimum applicable K0 value configured in a scheduling CC or BWP. uPDSCH may denote a value corresponding to the numerology of the scheduled CC or BWP among μ values of Table 7 below ("Table 4.2-1: Supported transmission numerologies" of TS38.211). uPDCCH may denote a value corresponding to the numerology of a scheduling CC or BWP among the μ values in Table 7 below. K0' may denote a K0 value (e.g., the number of slots based on the numerology of the scheduled CC or BWP) obtained by interpreting an indication of a DL grant of the scheduling CC or BWP using a TDRA table of the scheduled CC or BWP. For example, when cross-CC/BWP scheduling is used, K0' may denote a value obtained by reinterpreting a K0 value indicated through DCI based on an SCS of the corresponding scheduled CC or BWP. That is, K0' may be the same as K0 determined according to the method of FIG. 9. A slot corresponding to $K0_{Scheduled}=0$ may be the same as a slot corresponding to K0=0 in the method of FIG. 9.

According to this method, there is an advantage in that the minimum applicable K0 value configured in the scheduling CC/BWP is guaranteed even if cross-CC/BWP scheduling is used.

TABLE 7

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Additionally, even when DCI indicates CSI-RS reception, the $K0_{Scheduled}$ value newly defined above may be applied as a minimum applicable value (or gap) for CSI-RS reception.

As another example, the slot offset $K0_{Scheduled}$ applied to the scheduled CC or BWP may also be defined as $\min\_K0_{Scheduling} \times 2^{(uPDSCH-uPDCCH)} + K0$. Here, K0 may represent a slot offset indicated by the DCI, rather than K0'.

Figure 11:
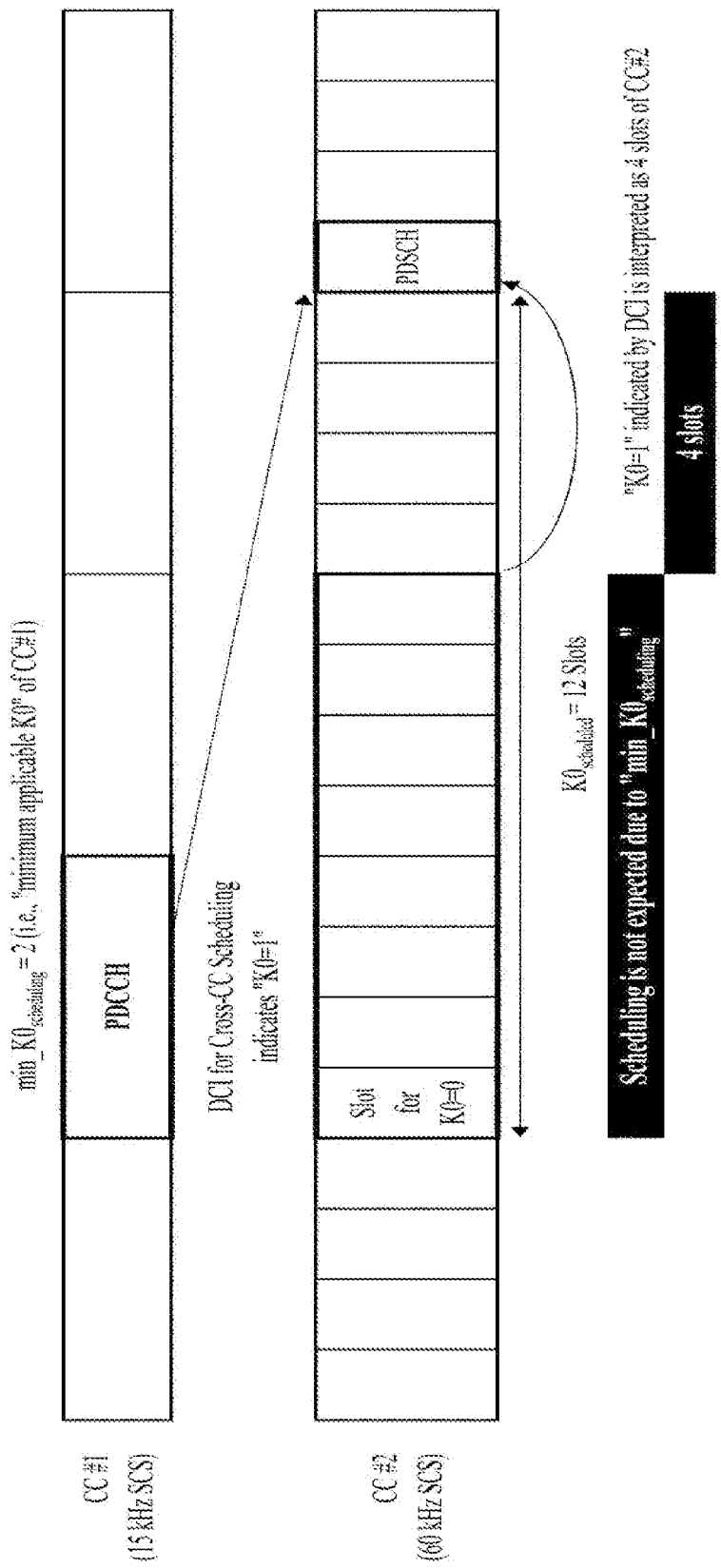
Figure 12:
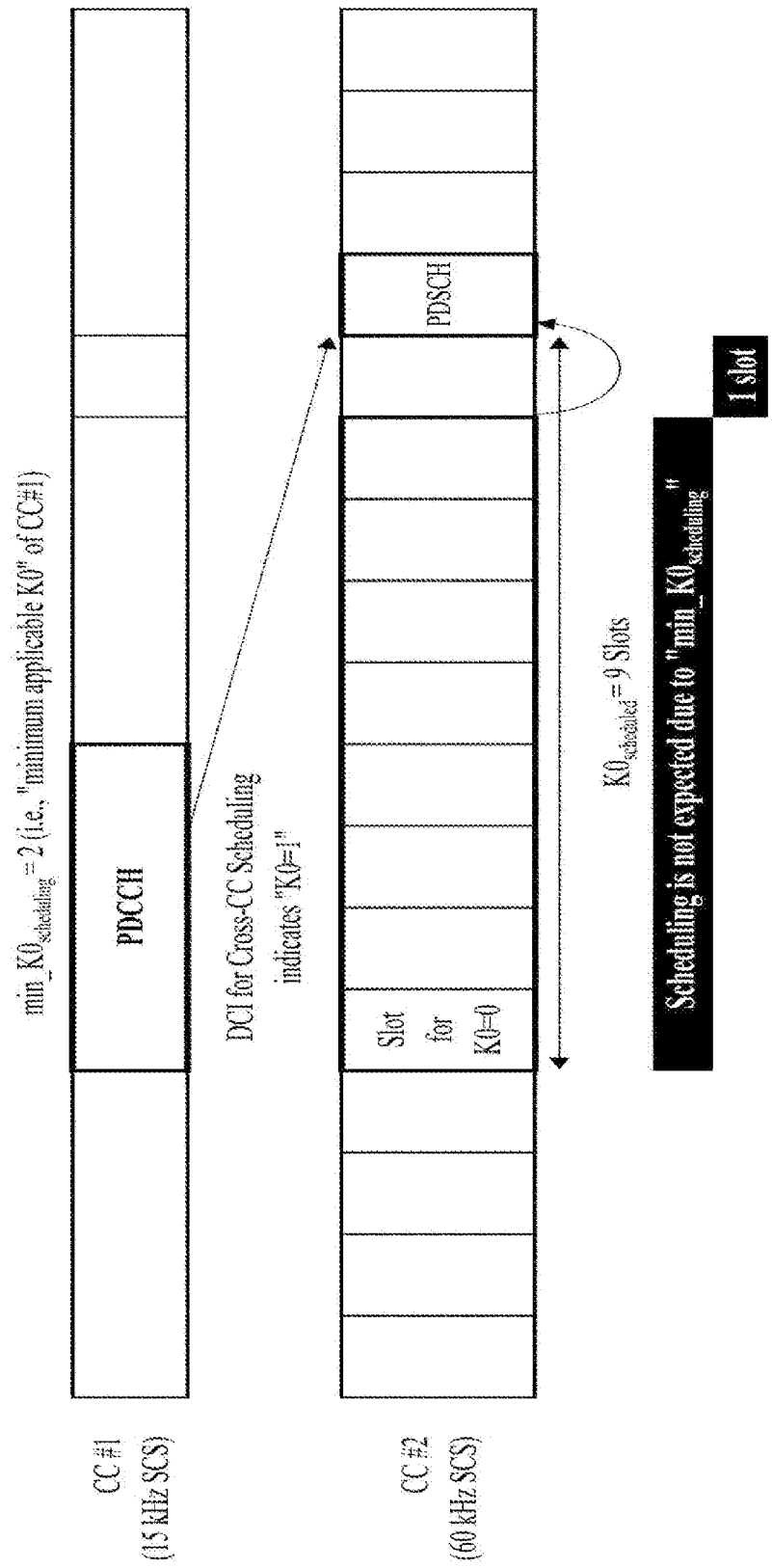

FIG. 11 illustrates $[K0_{Scheduled} = \min\_K0_{Scheduling} \times 2^{(uPDSCH-uPDCCH)} + K0']$, and FIG. 12 illustrates $[K0_{Scheduled} = \min\_K0_{Scheduling} \times 2^{(uPDSCH-uPDCCH)} + K0]$. It is assumed in FIGS. 11 and 12 that $\min\_K0_{Scheduling}$ (i.e., minimum applicable K0 value configured in CC #1) is 2-slot, K0 of a 1-slot size is indicated through a specific field of the DCI, and a carrier indication field (CIF) of the DCI indicates CC #2.

In addition, a slot offset $K2_{Scheduled}$ applied to the scheduled CC or BWP may be mi defined as $\min\_K2_{Scheduling} \times 2^{(uPDSCH-uPDCCH)} + K2'$. $\min\_K2_{Scheduling}$ may denote a minimum applicable K2 value configured in the scheduling CC or BWP. uPUSCH may denote a value corresponding to the numerology of the scheduled CC or BWP among the μ values of Table 7. uPDCCH may denote a value corresponding to the numerology of the scheduling CC or BWP among the μ values of Table 7. K2' may denote a K2value (e.g., the number of slots based on the numerology of the scheduled CC or BWP) obtained by interpreting an indication of a UL grant of the scheduling CC or BWP using the TDRA table of the scheduled CC or BWP. For example, when cross-CC/BWP scheduling is used, K2' may mean a value obtained by reinterpreting a K2value indicated through the DCI based on the SCS of the corresponding scheduled CC or BWP. That is, K2' may be the same as K2determined according to the method of FIG. 9. A slot corresponding to $K2_{Scheduled} = 0$ may be the same as a slot corresponding to K2=0 in the method of FIG. 9.

According to this method, there is an advantage in that the minimum applicable K2value configured in the scheduling CC/BWP is guaranteed even if cross-CC/BWP scheduling is used.

Additionally, even when the DCI indicates SRS transmission, the $K2_{Scheduled}$ value newly defined above may be applied as a minimum applicable value (or gap) for SRS transmission.

As another example, the slot offset $K2_{Scheduled}$ applied to the scheduled CC or BWP may be defined as $\min\_K2_{Scheduling} \times 2^{(uPDSCH-uPDCCH)} + K2$. Here, K2 may represent the slot offset indicated by the DCI, rather than K2', According to the above-mentioned proposal, the regulation for the PDCCH-to-PDSCH/PUSCH timing of Table 7 may be modified as shown in Table 8.

TABLE 8

[PDSCH transmission timing]

The slot allocated for the PDSCH is $\left\lfloor n \cdot \frac{2^{PDCCH}}{2^{PDSCH}} \right\rfloor + K_0 + \min K0'$, where n is the slot with the scheduling DCI (i.e., PDCCH), and $K_0$ is based on the numerology of PDSCH, and $P_{PDSCH}$ and $P_{PDCCH}$ are the subcarrier spacing configurations for PDSCH and PDCCH, respectively.

...

[PUSCH transmission timing]

The slot where the UE shall transmit the PUSCH is determined by $K_2$ as $\left\lfloor n \cdot \frac{2^{PDCCH}}{2^{PDSCH}} \right\rfloor + K_2 + \min K2'$ where n is the slot with the TABLE 8-continued scheduling DCI (i.e., PDCCH), $K_2$ is based on the numerology of PUSCH, and $P_{PUSCH}$ and $P_{PDCCH}$ are the subcarrier spacing configurations for PUSCH and PDCCH, respectively.

As an example, in Table 8, min_K0' may be defined as "$\min\_K0_{Scheduling} \times 2^{(uPDSCH-uPDCCH)}$" described above, and min_K2' may be defined as "$\min\_K2_{Scheduling} \times 2^{(uPDSCH-uPDCCH)}$" described above. In addition, min_K0' and min_K2' may be defined as minimum applicable K0 and K2, respectively, according to the numerology of the scheduled CC/BWP.

Figure 10:
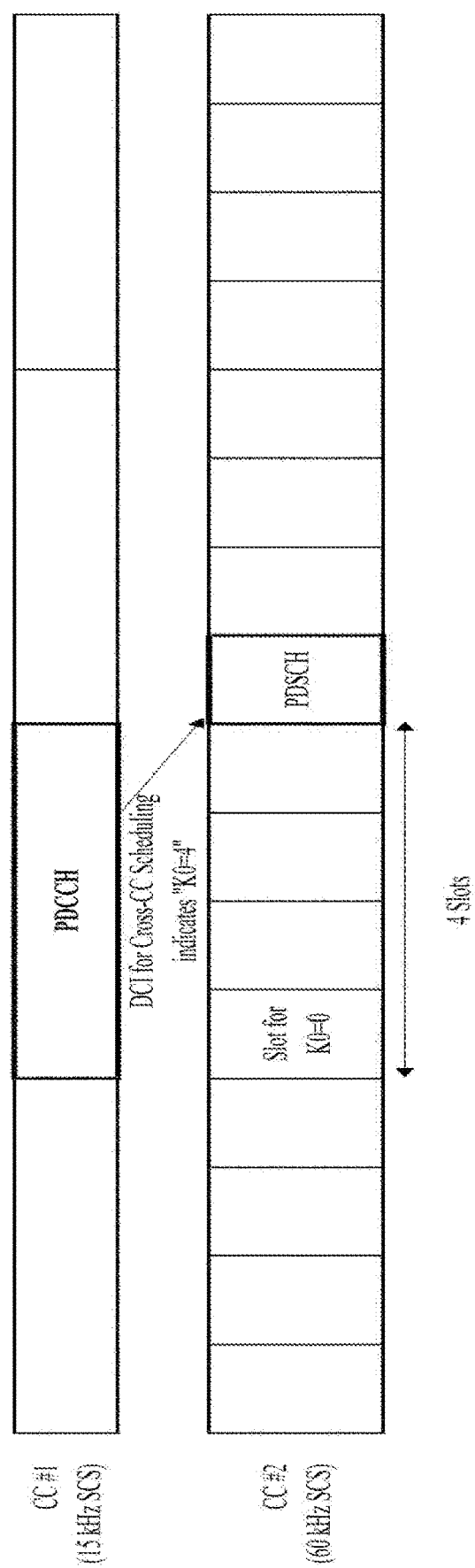

FIG. 10 illustrates PDSCH reception based on cross-carrier scheduling when the proposal of Table 8 is not applied, and FIG. 11 illustrates PDSCH reception based on cross-carrier scheduling when the proposal of Table 8 is not applied. The effect of FIG. 11 may be confirmed through a comparison between FIGS. 10 and 11. In FIGS. 10 and 11, it is assumed that the minimum applicable K0 value of CC #1 is 2. In FIG. 10, it is assumed that the PDSCH may exist in CC #2 when the UE monitors the PDCCH, so that the UE may not relax a PDCCH decoding rate. In contrast, FIG. 11 is advantageous in that the UE may lower the PDCCH decoding rate while the BS schedules the PDSCH using the same K0 value as in FIG. 10.

The UE may adjust the PDCCH decoding rate in the scheduling CC or BWP based on $K0_{Scheduled}$ and $K2_{Scheduled}$ values newly defined in the scheduled CC or BWP. A gap from a PDCCH to a PDSCH or a PUSCH that is likely to be scheduled may be different when there is a possibility that the PDCCH will performs cross-CC/BWP scheduling in a PDCCH decoding process and when there is no such possibility (i.e., self-CC/BWP scheduling). Accordingly, the minimum time K0 and/or K2 for decoding the PDCCH may be differently determined. The UE may assume a minimum time to be consumed for PDCCH decoding to determine K0 and/or K2 as follows. The UE may not expect that the BS will perform DL/UL data transmission during the minimum time to be consumed for PDCCH decoding.

(A) If a corresponding search space (SS) is available only for cross-CC/BWP scheduling DCI, the UE may assume the smaller of $K0_{Scheduled}$ and $K2_{Scheduled}$ as the minimum time required for PDCCH decoding or assume $K2_{Scheduled}$ as the minimum time required for PDCCH decoding.

(B) If the corresponding SS is available only for self-CC/BWP scheduling DCI, the UE may assume the smaller of the existing K0 and K2 values as the minimum time required for PDCCH decoding, assume the smaller of the minimum applicable K0 and minimum applicable K2 as the minimum time required for PDCCH decoding, or assume the minimum applicable K2 as the minimum time required for PDCCH decoding.

(C) If the corresponding SS is available for both self-CC/BWP scheduling DCI and cross-CC/BWP scheduling DCI, the UE may assume a minimum value of the minimum time required for PDCCH decoding according to (A) and the minimum time required for PDCCH decoding according to (B) as the minimum time required for PDCCH decoding.

According to an embodiment of the present disclosure, if a first CC or a first BWP cross-schedules a PDSCH in a second CC or a second BWP having a different numerology (SCS) therefrom, a scheduling delay (K1) value of a PUCCH (a channel including HARQ-ACK/NACK information for a scheduled PDSCH) that the UE expects may be defined as follows.

The slot offset K1 applied to a CC or BWP in which the PUCCH is transmitted may be defined as min_K1× $2^{(uPUCCH-uPDCCH)}$+K1'.

min_K1 may be the minimum applicable K1 configured in a CC or a BWP in which the PUCCH is transmitted. uPUCCH may denote a µ value corresponding to the numerology of the CC or the BWP in which the PUCCH is transmitted among the µ values of Table 7. uPDCCH may denote a µ value corresponding to the numerology of the scheduling CC or BWP among the values of Table 7. K1' may denote a K1 value in the CC or BWP in which the PUCCH is transmitted (e.g., a K1 value applied to the CC/BWP in which the PUCCH related to cross-CC/BWP scheduling is transmitted in cross-CC/BWP scheduling according to the existing method).

According to an embodiment of the present disclosure, when the numerologies of multiple CCs or multiple BWPs configured for the UE are different as in the case in which the first CC or the first BWP cross-schedules the PDSCH in the second CC or the second BWP having a different numerology (SCS) therefrom, a method of configuring the minimum applicable K0, K1, or K2 value may be defined as follows.

For example, the UE/BS may configure the minimum applicable K0, K1 or K2 value for each numerology (regardless of a CC or a BWP).

According to an embodiment of the present disclosure, the UE/BS may configure/determine the number of slots based on a specific reference numerology µ1 (regardless of the numerology of a corresponding CC or a corresponding BWP) as a first minimum applicable K0, K1, or K2 value $K0_{min}$, $K1_{min}$, or $K2_{min}$. The UE/BS may obtain a second minimum applicable K0, K1, or K2 value to be applied to the corresponding CC or the corresponding BWP by scaling the first minimum applicable K0, K1, or K2 value $K0_{min}$, $K1_{min}$, or $K2_{min}$ based on a ratio between a numerology µ2 of a corresponding CC or a corresponding BWP to which $K0_{min}$, $K1_{min}$, or $K2_{min}$ is to be applied and the reference numerology µ1.

For example, the UE/BS may scale the first applicable K0, K1, or K2 value $K0_{min}$, $K1_{min}$, or $K2_{min}$ in proportion to the ratio (e.g., $2^{\mu 2}/2^{\mu 1}$) between the numerology µ2 of the corresponding CC or BWP and the reference numerology µ1. "Proportion" may be understood as meaning that, when the first minimum applicable K0 related to the reference numerology µ1 is represented as $K0_{min}$, the UE/BS determines the second minimum applicable K0 based on "$K0_{min} \times 2^{\mu 2}/2^{\mu 1}$". Likewise, "Proportion" may be understood as meaning that, when the first minimum applicable K2 related to the reference numerology µ1 is represented as $K2_{min}$, the UE/BS determines the second minimum applicable K2 based on "$K2_{min} \times 2^{\mu 2}/2^{\mu 1}$".

For example, the reference numerology may be defined as 15 kHz and 120 kHz in frequency range 1 (FR1) and frequency range 2 (FR2) of NR, respectively.

As another example, the reference numerology may be the numerology of a BWP previously used by the UE/BS. For example, while transmitting/receiving a signal through a first BWP configured with a first numerology, if the UE/BS intends to transmit/receive the signal through a new second BWP configured with a second numerology, the UE/BS may determine the second minimum applicable K0, K1 or K2 value in the new second BWP configured with the second numerology.

The UE/BS may determine the second minimum applicable K0, K1 or K2 value in the new second BWP based on the reference numerology µ1 of the first numerology of the previously used first BWP. For example, as described above, the UE/BS may determine the second minimum applicable K0, K1 or K2value in proportion to "$2^{\mu 2}/2^{\mu 1}$". More specifically, the UE/BS may determine the second minimum applicable K0 value based on "$K0_{min} \times 2^{\mu 2}/2^{\mu 1}$", where $K0_{min}$ may denote the first minimum applicable K0 configured in the first BWP. Upon receiving DCI for scheduling PDSCH reception in the second BWP in slot n, the UE may assume/expect that the DCI will not indicate a K0 value smaller than the second minimum applicable K0. The BS may not expect that the UE that has received the DCI for scheduling PDSCH reception in the second BWP in slot n will perform PDSCH reception based on the K0 value smaller than the second minimum applicable K0. The UE that has received the DCI for scheduling PDSCH reception in the second BWP in slot n may not be expected to perform PDSCH reception based on the K0 value smaller than the second minimum applicable K0. Additionally, the UE/BS may determine the second minimum applicable K2 value based on "$K2_{min} \times 2^{\mu 2}/2^{\mu 1}$", where $K2_{min}$ may denote the second minimum applicable K0 configured in the first BWP. Upon receiving the DCI for scheduling PUSCH transmission in the second BWP in slot n, the UE may assume/expect that the DCI will not indicate a K2 value smaller than the second minimum applicable K2. The BS may not expect that the UE that has received the DCI for scheduling PUSCH transmission in the second BWP in slot n will perform PUSCH transmission based on the K2 value smaller than the second minimum applicable K2. The UE that has received the DCI for scheduling PUSCH transmission in the second BWP in slot n may not be expected to perform PUSCH transmission based on the K2 value smaller than the second minimum applicable K2. On the other hand, an initial BWP used by the UE/BS during initial access may be used as the reference numerology. For example, while the UE/BS transmits and receives a signal through the initial BWP, if the UE/BS desires to change to the BWP to a new BWP, signal transmission/reception in the new BWP may be performed as in the above-described process by configuring the numerology of the initial BWP as the reference numerology.

As another example, the reference numerology may be defined as a minimum numerology among the numerologies of CC(s) or BWP(s) configured for the UE/BS.

Meanwhile, the term "minimum applicable K0" mentioned above may also be referred to as the "minimum scheduling offset K0". The term "minimum applicable K2" may also be referred to as the "minimum scheduling offset K2".

When a plurality of BWPs is configured for one UE and numerologies (SCSs) are different for the respective BWPs, there may be an ambiguity problem in applying the minimum scheduling offsets K0 and K2. In the proposed embodiment of the present disclosure, this problem may be solved by applying the minimum scheduling offsets K0 and K2 based on the reference numerology. The reference numerology may represent the numerology of a specific BWP. For the UE that desires to change an initial BWP, the reference numerology may be the numerology of the initial BWP.

The UE may receive DCI for scheduling a PDSCH in the second BWP having the second numerology. The DCI may include indication information about the minimum scheduling offset K0. The UE may receive the PDSCH by applying the minimum scheduling offset K0 to the second BWP. In applying the minimum scheduling offset K0 indicated by the DCI to the second BWP, the UE may obtain/apply the minimum scheduling offset K0 using the first numerology of the first BWP as a reference. The first BWP may have been used by the UE before the second BWP. Application of the minimum scheduling offset K0 may include scaling according to a ratio between the first numerology and the second numerology.

The UE may receive DCI for scheduling a PUSCH in the second BWP having the second numerology. The DCI may include indication information about the minimum scheduling offset K2. The UE may transmit the PUSCH by applying the minimum scheduling offset K2 to the second BWP. In applying the minimum scheduling offset K2 indicated by the DCI to the second BWP, the UE may obtain/apply the minimum scheduling offset K0 using the first numerology of the first BWP as a reference. The first BWP may have been used by the UE before the second BWP. Application of the minimum scheduling offset K2 may include scaling according to the ratio between the first numerology and the second numerology.

According to an embodiment of the present disclosure, when the SCS of the second BWP is larger than the SCS of the first BWP, if the minimum scheduling offset K0 indicated by the DCI is applied to the second BWP, a problem that the PDSCH, which has not been buffered in the second BWP by the UE, is located after the minimum scheduling offset (e.g., a problem that a corresponding PDSCH signal may not be buffered by the UE at a time when DCI decoding is completed) may be solved.

Figure 13:
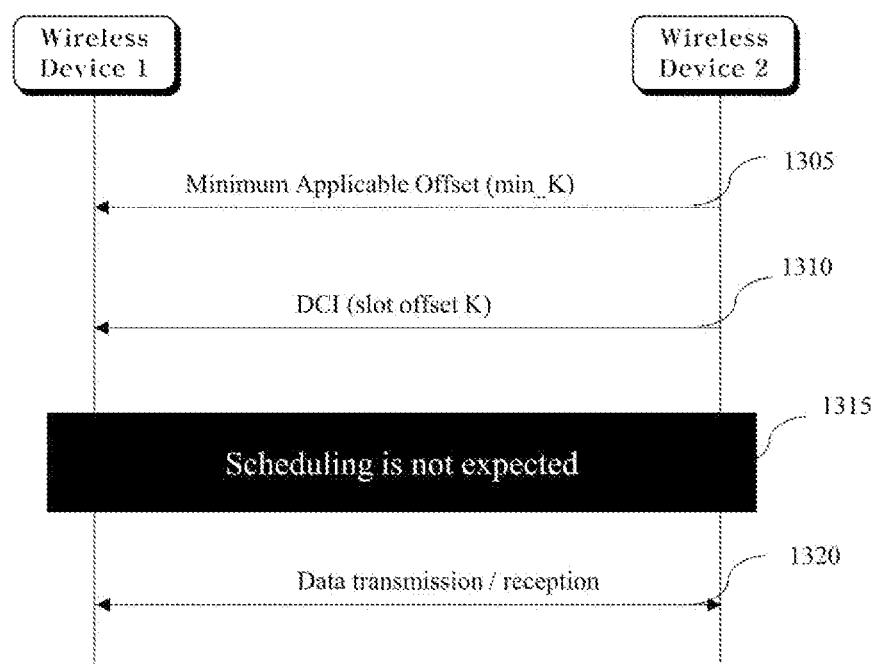
FIGS. 13 and 14 illustrate signal transmission and reception according to an embodiment of the present disclosure.

FIG. 13 illustrates signal transmission and reception according to an embodiment of the present disclosure.

In FIG. 13, a wireless device 1 and a wireless device 2 may operate in the same wireless communication system as different wireless communication devices. The wireless communication system may be, for example, a 3GPP-based wireless communication system. For convenience of explanation, it is assumed in FIG. 13 that the wireless device 1 is a UE, the wireless device 2 is a BS, and the UE and the BS transmit and receive DCI through a PDCCH, but the scope of the present disclosure is not limited thereto. As another example, the wireless device 1/wireless device 2 may be a UE/UE (e.g., device-to-device (D2D) communication UEs, sidelink communication UEs, or vehicle-to-everything (V2X) UEs), a BS/BS (e.g., BSs supporting wireless backhaul or BSs supporting integrated access backhaul (IAB)), or a BS/UE (e.g., for UCI transmission/reception).

Figure 15:
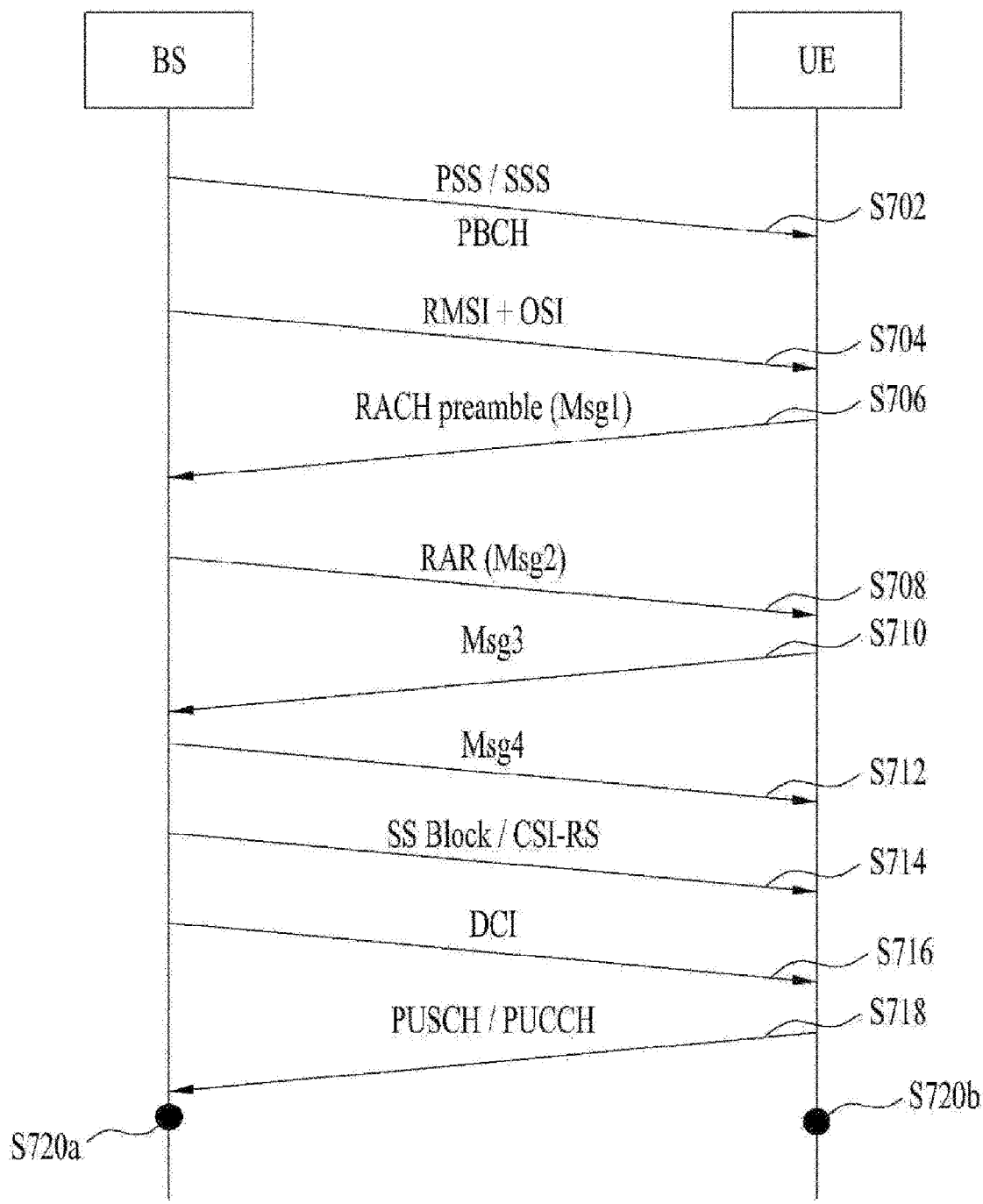
FIG. 15 illustrates a network access procedure applicable to the present disclosure.

For example, the UE may access the BS through an initial access procedure (e.g., FIG. 15). In addition, as an example, the UE may perform a DRX (e.g., FIG. 20) operation.

Referring to FIG. 13, the UE may obtain information about a minimum applicable offset min_K from the BS (1305). The minimum applicable offset may include at least one of minimum applicable K0, K1, or K2. The minimum applicable offset value(s) may be indicated through system information or a higher layer (e.g., RRC) signal. A default value of the minimum applicable offset may be pre-defined. When the default value of the minimum applicable offset is used, step 1305 may be omitted.

The UE may receive DCI for scheduling data from the BS (1310). The DCI may include information about a PDCCH-to-data slot offset K. The DCI may be received through a PDCCH, and data may be transmitted/received through a PDSCH/PUSCH.

The UE may perform data transmission/reception in a slot determined based on min_K and/or K according to the proposals of the present disclosure (1320).

A duration in which DL/UL transmission scheduling is not expected may be included (1315) between a DCI reception time (1310) and a data transmission/reception time (1320), and the duration (1315) may be identified based on min_K according to the proposals of the present disclosure.

Figure 14:
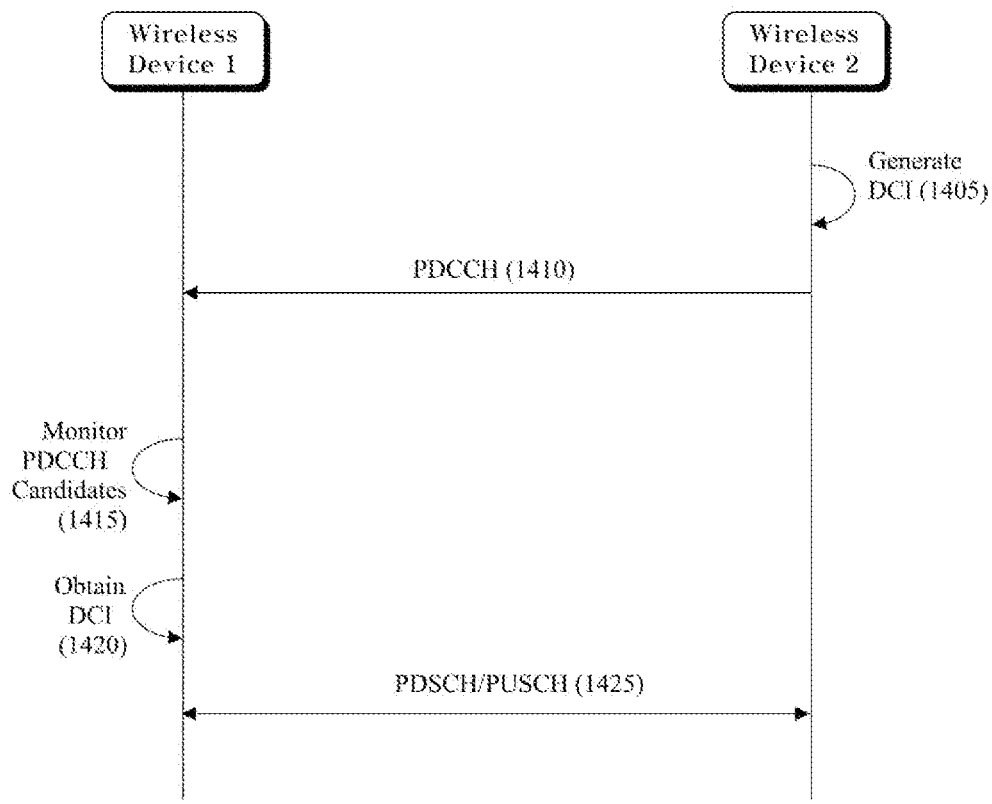

FIG. 14 illustrates signal transmission and reception according to an embodiment of the present disclosure. FIG. 14 does not necessarily constitute an independent invention from FIG. 13 or from the previously described embodiments and may be an exemplary implementation of the aforementioned embodiments. A description in FIG. 14 should be understood as a non-limiting example that does not limit the scope of the present disclosure, and a description overlapping with the previously described content may be omitted.

In FIG. 14, a wireless device 1 and a wireless device 2 may operate in the same wireless communication system as different wireless communication devices. The wireless communication system may be, for example, a 3GPP-based wireless communication system. For convenience of description, it is assumed in FIG. 13 that the wireless device 1 is a UE, the wireless device 2 is a BS, and the UE and the BS transmit and receive DCI on a PDCCH, but the scope of the present disclosure is not limited thereto. As another example, the wireless device 1/wireless device 2 may be a UE/UE (e.g., D2D communication UEs, sidelink communication UEs, or V2X UEs), a BS/BS (e.g., BSs supporting wireless backhaul or BSs supporting IAB), or a BS/UE (e.g., for UCI transmission/reception).

As an example, the UE may access the BS through an initial access procedure (e.g., FIG. 15). For example, the UE may perform a DRX (e.g., FIG. 20) operation.

Referring to FIG. 14, the BS may generate DCI (1405). The DCI may be DL grant DCI for scheduling a PDSCH or UL grant DCI for scheduling a PUSCH. The DCI may schedule reception of the PDSCH or transmission of the PUSCH in a second BWP configured with a second SCS. At a time of generating the DCI, the BS may be in a state in which a first slot to which the corresponding PDCCH is to be mapped and a second slot to which the corresponding PDSCH/PUSCH is to be mapped have been determined. The DCI may be configured to include/indicate information regarding the slot offset 'K' between the first slot and the second slot.

The BS may transmit the PDCCH carrying the DCI through a candidate in the first slot among PDCCH candidates (1410). The BS may map the PDCCH to the candidate in the first slot among the PDCCH candidates.

The UE may monitor the PDCCH candidates (1415). As a result of monitoring the PDCCH candidates, the UE may obtain the DCI through the PDCCH detected in the first slot (1420). The UE may attempt to detect the PDCCH by blind-decoding the PDCCH candidates.

In blind-decoding the PDCCH candidates, the UE may attempt to detect the PDCCH under the assumption that the corresponding DCI is the DL grant DCI and/or under the assumption that the corresponding DCI is the UL grant DCI. In addition, the assumption of the DL grant DCI may be interpreted as meaning that the UE assumes reception of the PDSCH, and the assumption of the UL grant DCI may be interpreted as meaning that the UE assumes transmission of the PUSCH. For example, since the UE should complete PDCCH detection and DCI acquisition before the second slot, the UE may control a monitoring rate of the PDCCH candidates and a DCI decoding rate (and/or accompanying power consumption) in consideration of the earliest time point at which PDSCH reception may be scheduled or the earliest time point at which PUSCH transmission may be scheduled.

The UE may receive the PDSCH or transmit the PUSCH in the second slot based on the DCI (1425). The UE may determine, based on the slot offset 'K' included in the DCI, the second slot in which reception of the PDSCH or transmission of the PUSCH is to be performed.

A minimum value 'Min_K' for the slot offset 'K' in the second BWP may be determined based on a first SCS configured in a first BWP different from the second BWP. For example, the first BWP may be a BWP that has been previously used by the UE/BS.

The first SCS and the second SCS may be different.

In the case in which the second BWP is different from the first BWP, the UE/BS may determine the minimum value 'Min_K' based on a ratio between the second SCS and the first SCS. For example, the minimum value 'Min_K' may be determined to be proportional to the ratio between the second SCS and the first SCS. As a specific example, the minimum value 'Min_K' may be determined based on "$2^{\mu 2}/2^{\mu 1}$", where 'µ1' may denote a value indicating the first SCS configured in the first BWP, and 'µ2' may denote a value indicating the second SCS configured in the second BWP (e.g., see Table 7). The minimum value 'Min_K' may be determined based on '$(2^{\mu 2}/2^{\mu 1})$*min_Slot_Offset', where 'min_Slot_Offset' may denote the minimum value 'Min_K' configured in the first BWP.

The UE may not be expected to perform PDSCH reception or PUSCH transmission in a slot related to a 'K' value smaller than the determined minimum value 'Min_K'. The BS may not expect that the UE will perform PDSCH reception or PUSCH transmission in the slot related to the 'K' value smaller than the minimum value 'Min_K'.

In the process of monitoring the PDCCH candidates and obtaining the DCI, the UE may assume that the DCI will not indicate the 'K' value smaller than the minimum value 'Min_K'. The BS may generate the DCI so as not to indicate the 'K' value smaller than the minimum value 'Min_K'.

A BWP in which the PDCCH is detected may be different from the second BWP in which PDSCH reception or PUSCH transmission is performed. The BWP in which the PDCCH is detected may be the first BWP or a third BWP.

The UE may receive, through RRC signaling, at least one of a first TDRA table related to the PDSCH or a second TDRA table related to the PUSCH. The first TDRA table may include one or more PDCCH-to-PDSCH slot offset 'K0' values. The second TDRA table may include one or more PDCCH-to-PUSCH slot offset 'K2' values. When the DCI is the DL grant DCI, the slot offset 'K' may be one of the 'K0' values of the first TDRA table. Alternatively, when the DCI is the UL grant DCI, the slot offset 'K' may be one of the 'K2' values of the second TDRA table.

When the minimum value 'Min_K' is a minimum value 'Min_K0' related to the PDSCH (e.g., when the DCI is DL grant DCI or when the detection of the DL grant DCI is being attempted), the UE may assume that a value smaller than the minimum value 'Min_K0' among the 'K0' values of the first TDRA table is not indicated by the slot offset 'K'). When the minimum value 'Min_K' is the minimum value 'Min_K0' related to the PDSCH, the BS may generate the DCI such that the slot offset 'K' does not indicate a value smaller than the minimum value 'Min_K0' among the 'K0' values of the first TDRA table.

When the minimum value 'Min_K' is a minimum value 'Min_K2' related to the PUSCH (e.g., when the DCI is UL grant DCI or when the detection of the UL grant DCI is being attempted), the UE may assume that a value smaller than the minimum value 'Min_K2' among the 'K2' values of the second TDRA table is not indicated by the slot offset 'K'. When the minimum value 'Min_K' is the minimum value 'Min_K2' related to the PUSCH, the BS may generate the DCI such that the slot offset 'K' does not indicate a value smaller than the minimum value 'Min_K2' among the 'K2' values of the second TDRA table.

The UE/BS may determine the minimum value 'Min_K0' as the minimum value 'Min_K' related to the PDSCH. The UE/BS may determine the minimum value 'Min_K2' as the minimum value 'Min_K' related to the PUSCH. The minimum value 'Min_K0' and the minimum value 'Min_K2' may be determined independently of each other.

Meanwhile, a plurality of CCs may be configured for the UE, and the UE/BS may support cross-carrier scheduling and/or cross-BWP scheduling. For example, the UE may perform monitoring of PDCCH candidates in a specific BWP of a first CC. The UE may perform PDSCH reception or PUSCH transmission in a second CC including the second BWP. The specific BWP may be the first BWP but may be another BWP different from the first BWP. The first BWP may be a BWP located in the first CC or a BWP located in the second CC. The UE may determine the second slot using the minimum value 'Min_K' configured for the specific BWP of the first CC. For example, the second slot may be slot #(n+m+k). "Slot #n" may denote a slot having the lowest index among slots of the second BWP overlapping with a slot of the specific BWP in which the PDCCH is detected. "m" may represent the minimum value 'Min_K' configured for the specific BWP as the number of slots in the second BWP. "k" may denote a slot offset indicated by the DCI as the number of slots in the second BWP.

The UE may perform a network access process to perform the afore-described/proposed procedures and/or methods. For example, while accessing the network (e.g., BS), the UE may receive system information and configuration information required to perform the afore-described/proposed procedures and/or methods and store the received information in a memory. The configuration information required for the present disclosure may be received by higher-layer (e.g., RRC or medium access control (MAC)) signaling.

FIG. 15 is a diagram illustrating an initial network access and subsequent communication process. In NR, a physical channel and an RS may be transmitted by beamforming. When beamforming-based signal transmission is supported, beam management may follow, for beam alignment between a BS and a UE. Further, a signal proposed by the present disclosure may be transmitted/received by beamforming. In RRC IDLE mode, beam alignment may be performed based on an SSB, whereas in RRC CONNECTED mode, beam alignment may be performed based on a CSI-RS (in DL) and an SRS (in UL). On the contrary, when beamforming-based signal transmission is not supported, beam-related operations in the following description may be skipped.

Referring to FIG. 15, a BS (e.g., eNB) may periodically transmit an SSB (S702). The SSB includes a PSS/SSS/PBCH. The SSB may be transmitted by beam sweeping. The BS may then transmit remaining minimum system information (RMSI) and other system information (OSI) (S704). The RMSI may include information required for initial access to the BS (e.g., physical random access channel (PRACH) configuration information). After detecting SSBs, the UE identifies the best SSB. The UE may then transmit a random access channel (RACH) preamble (Message 1 or Msg1) in PRACH resources linked/corresponding to the index (i.e., beam) of the best SSB (S706). The beam direction of the RACH preamble is associated with the PRACH resources. Association between PRACH resources (and/or RACH preambles) and SSBs (indexes) may be configured by system information (e.g., RMSI). Subsequently, in an RACH procedure, the BS may transmit a random access response (RAR) (Msg2) in response to the RACH preamble (S708), the UE may transmit Msg3 (e.g., RRC Connection Request) based on a UL grant included in the RAR (S710), and the BS may transmit a contention resolution message (Msg4) (S720). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (S714). The SSB/CSI-RS may be used for the UE to generate a beam/CSI report. The BS may request the UE to transmit a beam/CSI report, by DCI (S716). In this case, the UE may generate a beam/CSI report based on the SSB/CSI-RS and transmit the generated beam/CSI report to the BS on a PUSCH/PUCCH (S718). The beam/CSI report may include a beam measurement result, information about a preferred beam, and so on. The BS and the UE may switch beams based on the beam/CSI report (S720a and S720b).

Subsequently, the UE and the BS may perform the above-described/proposed procedures and/or methods. For example, the UE and the BS may transmit a wireless signal by processing information stored in a memory or may process a received wireless signal and store the processed signal in the memory according to the proposals of the present disclosure, based on configuration information obtained in the network access process (e.g., a system information acquisition process, an RRC connection process through an RACH, and so on). The wireless signal may include at least one of a PDCCH, a PDSCH, or an RS on DL and at least one of a PUCCH, a PUSCH, or an SRS on UL.

Various descriptions, functions, procedures, proposals, methods, and/or operational flow charts of the present disclosure may be applied to, but not limited to, various fields requiring wireless communication/connection (e.g., 5G) between devices.

With reference to the drawings, the present disclosure will be described in greater detail. In the following drawings/description, like reference numerals may denote the same or corresponding hardware blocks, software blocks, or functional blocks, unless otherwise specified.

Figure 16:
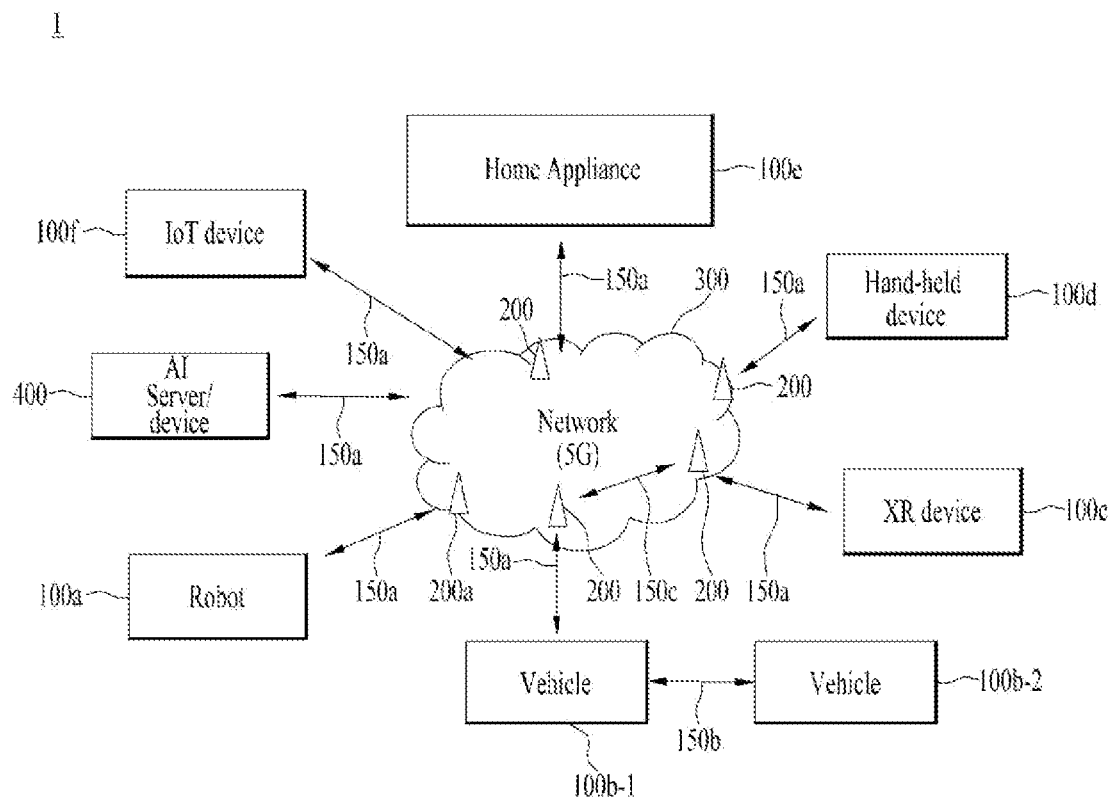
FIGS. 16 to 19 illustrate a communication system 1 and wireless devices applicable to the present disclosure.

FIG. 16 illustrates a communication system 1 applied to the present disclosure.

Referring to FIG. 16, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
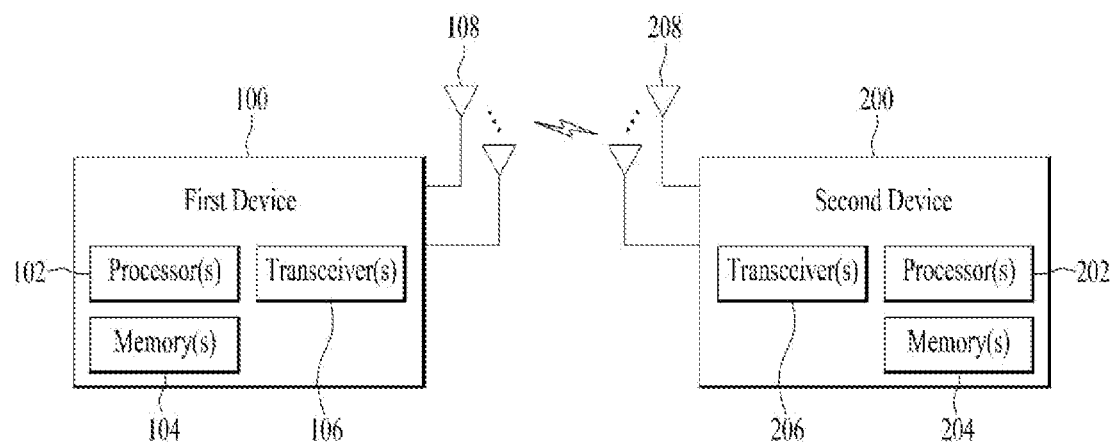

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
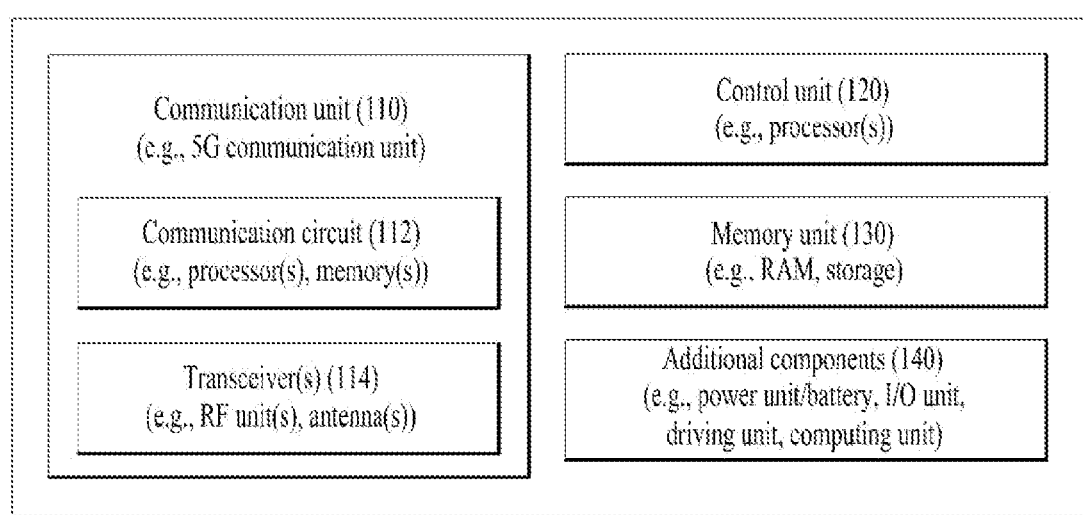

FIG. 18 illustrates another example of a wireless device applied to the present disclosure. The wireless device may be implemented in various forms according to a use-case/service (refer to FIG. 16).

Referring to FIG. 18, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 16), the vehicles (100*b*-1 and 100*b*-2 of FIG. 16), the XR device (100*c* of FIG. 16), the hand-held device (100*d* of FIG. 16), the home appliance (100*e* of FIG. 16), the IoT device (100*f* of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 19:
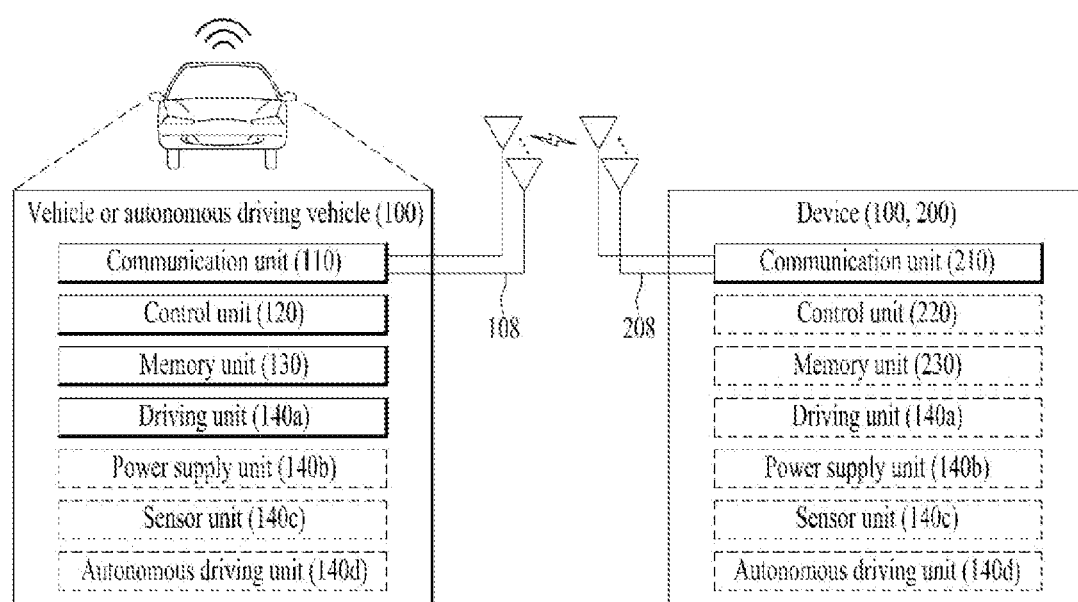

FIG. 19 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 19, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 20:
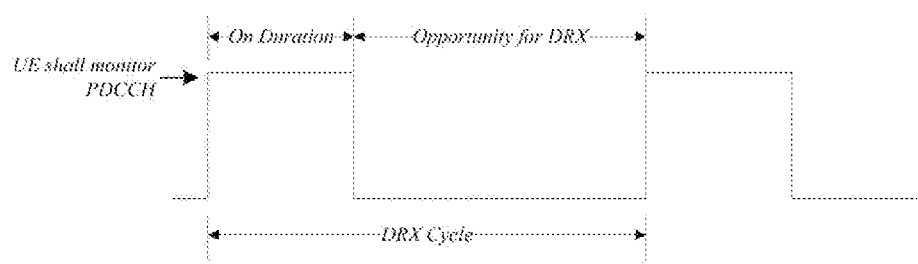
FIG. 20 illustrates a discontinuous reception (DRX) operation applicable to the present disclosure.

FIG. 20 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 20, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 9 describes a DRX operation of a UE (in the RRC_CONNECTED state). Referring to Table 9, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 9

| | Type of signals | UE procedure |
|---|---|---|
| $1^{st}$ step | RRC signalling (MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

- Value of drx-OnDurationTimer: defines the duration of the starting period of the DRX cycle.
- Value of drx-InactivityTimer: defines the duration of a time period during which the UE is awake after a PDCCH occasion in which a PDCCH indicating initial UL or DL data has been detected
- Value of drx-HARQ-RTT-TimerDL: defines the duration of a maximum time period until a DL retransmission is received after reception of a DL initial transmission.
- Value of drx-HARQ-RTT-TimerDL: defines the duration of a maximum time period until a grant for a UL retransmission is received after reception of a grant for a UL initial transmission.
- drx-LongCycleStartOffset: defines the duration and starting time of a DRX cycle.
- drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

Upon generating/mapping/transmitting the PDCCH for/to/to the UE, the BS may transmit the PDCCH in the On Duration so that the UE may detect the PDCCH.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method of transmitting or receiving a signal by a user equipment (UE) in a wireless communication system, the method comprising:
   monitoring physical downlink control channel (PDCCH) candidates;
   obtaining downlink control information (DCI) through a PDCCH detected in a first slot as a result of monitoring the PDCCH candidates; and
   receiving a physical downlink shared channel (PDSCH) or transmitting a physical uplink shared channel (PUSCH) in a second slot based on the DCI,
   wherein the DCI schedules the reception of the PDSCH or the transmission of the PUSCH in a second bandwidth part (BWP) configured with a second subcarrier spacing (SCS) and the DCI is configured to include information about a slot offset 'K' between the first slot and the second slot,
   wherein the UE determines, based on the slot offset 'K', the second slot in which the reception of the PDSCH or the transmission of the PUSCH is to be performed,
   wherein a minimum value 'Min_K' for the slot offset 'K' in the second BWP is determined based on a first SCS configured in a first BWP different from the second BWP, and
   wherein a ratio between the second SCS and the first SCS is used to determine the minimum value 'Min_K' based on that the first BWP and the second BWP are different from each other.

2. The method of claim 1, wherein the UE is not expected to receive the PDSCH or transmit the PUSCH in a slot related to a 'K' value smaller than the determined minimum value 'Min_K'.

3. The method of claim 1, wherein the UE assumes that the DCI will not indicate a 'K' value smaller than the determined minimum value 'Min_K' in a process of monitoring the PDCCH candidates and acquiring the DCI.

4. The method of claim 1, wherein the first BWP is a BWP which has been previously used by the UE.

5. The method of claim 1, wherein the minimum value 'Min_K' is determined to be proportional to the ratio between the second SCS and the first SCS.

6. The method of claim 1, wherein the minimum value 'Min_K' is determined based on '$2^{\mu 2}/2^{\mu 1}$', where '$\mu 1$' is a value denoting the first SCS configured in the first BWP and '$\mu 2$' is a value denoting the second SCS configured in the second BWP.

7. The method of claim 6, wherein the minimum value 'Min_K' is determined based on '$(2^{\mu 2}/2^{\mu 1})$*min_Slot_Offset', where 'min_Slot)Offset' denotes the minimum value 'Min_K' configured in the first BWP.

8. The method of claim 1, wherein a BWP in which the PDCCH is detected is different from the second BWP in which reception of the PDSCH or transmission of the PUSCH is performed.

9. The method of claim 1, further comprising:
   receiving at least one of a first time domain resource allocation (TDRA) table related to the PDSCH or a second TDRA table related to the PUSCH, through radio resource control (RRC) signaling,
   wherein the first TDRA table includes one or more PDCCH-to-PDSCH slot offset 'K0' values,
   wherein the second TDRA table includes one or more PDCCH-to-PUSCH slot offset 'K2' values, and
   wherein the slot offset 'K' is one of the 'K0' values of the first TDRA table or one of the 'K2' values of the second TDRA table.

10. The method of claim 9,
    wherein the UE assumes that, based on the minimum value 'Min_K', which is a minimum value 'Min_K0' related to the PDSCH, a value smaller than the minimum value 'Min_K0' among the 'K0' values of the first TDRA table is not indicated 'Min_K0' 'K0' by the slot offset 'K', or
    wherein the UE assumes that, based on the minimum value 'Min_K' which is a minimum value 'Min_K2' related to the PUSCH, a value smaller than the minimum value 'Min_K2' among the 'K2' values of the second TDRA table is not indicated 'Min_K2' 'K2' by the slot offset 'K'.

11. The method of claim 1,
    wherein the UE determines a minimum value 'Min K0' as the minimum value 'Min_K' related to the PDSCH and determines a minimum value 'Min_K2' as the minimum value 'Min_K' related to the PUSCH, and
    wherein the minimum value 'Min K0' and the minimum value 'Min_K2' are determined independently of each other.

12. The method of claim 1,
    wherein the monitoring the PDCCH candidates is performed in a specific BWP of a first component carrier (CC) among a plurality of CCs configured for the UE,
    wherein the receiving the PDSCH or the transmitting the PUSCH is performed in a second CC including the second BWP, and
    wherein the UE determines the second slot using a minimum value 'Min_K' configured for the specific BWP of the first CC.

13. The method of claim 12, wherein the second slot is slot #(n+m+k), where "slot #n" denotes a slot having a lowest index among slots of the second BWP overlapping with a slot of the specific BWP in which the PDCCH is detected, "m" denotes the minimum value 'Min_K' configured for the specific BWP as the number of slots in the second BWP, and "k" denotes a slot offset indicated by the DCI as the number of slots in the second BWP.

14. A device for performing signal processing for wireless communication, the device comprising:
    at least one processor configured to execute one or more instructions; and
    a memory configured to provide a reading/writing space in the at least one processor,
    wherein the at least one processor is configured to perform signal processing related to monitoring of physical downlink control channel (PDCCH) candidates based on execution of the one or more instructions, acquire downlink control information (DCI) through a PDCCH detected in a first slot as a result of monitoring the PDCCH candidates, and perform signal processing related to reception of a physical downlink shared channel (PDSCH) or transmission of a physical uplink shared channel (PUSCH) in a second slot based on the DCI, wherein the DCI schedules reception of the PDSCH or transmission of the PUSCH in a second bandwidth part (BWP) configured with a second subcarrier spacing (SCS) and the DCI is configured to include information about a slot offset 'K' between the first slot and the second slot, wherein the at least one processor determines the second slot in which reception of the PDSCH or transmission of the PUSCH is to be performed based on the slot offset 'K', wherein a minimum value 'Min_K' for the slot offset 'K' in the second BWP is determined based on a first SCS configured in a first BWP different from the second BWP, and wherein a ratio between the second SCS and the first SCS is used to determine the minimum value 'Min_K' based on that the first BWP and the second BWP are different from each other.

15. A method of transmitting or receiving a signal by a base station (BS) in a wireless communication system, the method comprising:

generating downlink control information (DCI);

transmitting a physical downlink control channel (PDCCH) carrying the DCI through a candidate in a first slot among PDCCH candidates; and transmitting a physical downlink shared channel (PDSCH) or receiving a physical uplink shared channel (PUSCH), scheduled by the DCI in a second slot, wherein the DCI schedules transmission of the PDSCH or reception of the PUSCH in a second bandwidth part (BWP) configured with a second subcarrier spacing (SCS) and the DCI is configured to include information about a slot offset 'K' between the first slot and the second slot, wherein the BS indicates the second slot in which transmission of the PDSCH or reception of the PUSCH is to be performed based on the slot offset 'K', wherein a minimum value 'MinK' for the slot offset 'K' in the second BWP is determined based on a first SCS configured in a first BWP different from the second BWP, and wherein a ratio between the second SCS and the first SCS is used to determine the minimum value 'MinK' based on that the first BWP and the second BWP are different from each other.

16. A base station (BS) for wireless communication, the BS comprising:

a transceiver; and at least one processor configured to generate downlink control information (DCI), wherein the at least one processor is configured to control the transceiver to transmit a physical downlink control channel (PDCCH) carrying the DCI through a candidate in a first slot among PDCCH candidates, and transmit a physical downlink shared channel (PDSCH) or receive a physical uplink shared channel (PUSCH), scheduled by the DCI in a second slot, wherein the DCI schedules transmission of the PDSCH or reception of the PUSCH in a second bandwidth part (BWP) configured with a second subcarrier spacing (SCS) and the DCI is configured to include information about a slot offset 'K' between the first slot and the second slot, wherein the at least one processor indicates the second slot in which transmission of the PDSCH or reception of the PUSCH is to be performed based on the slot offset 'K', wherein a minimum value 'Min_K' for the slot offset 'K' in the second BWP is determined based on a first SCS configured in a first BWP different from the second BWP, and wherein a ratio between the second SCS and the first SCS is used to determine the minimum value 'Min_K' based on that the first BWP and the second BWP are different from each other.

17. The device of claim 14, further comprising:

a transceiver configured to transmit or receive a radio signal under control of the processor.

18. The device of claim 17, wherein the device is a user equipment (UE).

19. A non-transitory medium which is readable by a processor and storing instructions which cause the processor to perform the method of claim 1.

* * * * *